United States Patent
Zhang

(10) Patent No.: US 9,107,105 B2
(45) Date of Patent: Aug. 11, 2015

(54) METHOD AND APPARATUS FOR CHANNEL PREDICTING

(75) Inventor: Zixiang Zhang, Chengdu (CN)

(73) Assignee: OPTIS CELLULAR TECHNOLOGY, LLC, Plano, TX (US)

( * ) Notice: Subject to any disclaimer, the term of this patent is extended or adjusted under 35 U.S.C. 154(b) by 0 days.

(21) Appl. No.: 14/351,901

(22) PCT Filed: Oct. 19, 2011

(86) PCT No.: PCT/CN2011/080978
§ 371 (c)(1),
(2), (4) Date: Apr. 15, 2014

(87) PCT Pub. No.: WO2013/056435
PCT Pub. Date: Apr. 25, 2013

(65) Prior Publication Data
US 2014/0254534 A1  Sep. 11, 2014

(51) Int. Cl.
H04W 4/00 (2009.01)
H04W 24/08 (2009.01)
H04L 25/02 (2006.01)
H04L 27/26 (2006.01)
H04L 5/00 (2006.01)

(52) U.S. Cl.
CPC ............ *H04W 24/08* (2013.01); *H04L 5/0078* (2013.01); *H04L 25/0222* (2013.01); *H04L 25/0232* (2013.01); *H04L 27/2647* (2013.01)

(58) Field of Classification Search
USPC .................................. 370/332, 333, 329, 342
See application file for complete search history.

(56) References Cited

U.S. PATENT DOCUMENTS

| | | | |
|---|---|---|---|
| 6,834,043 B1* | 12/2004 | Vook et al. ................... | 370/310 |
| 7,221,716 B2* | 5/2007 | Hwang .......................... | 375/316 |
| 7,382,718 B2* | 6/2008 | Chang et al. .................. | 370/204 |
| 7,746,970 B2 | 6/2010 | Mergen et al. | |
| 7,848,296 B2 | 12/2010 | Lee et al. | |
| 2005/0227697 A1* | 10/2005 | Borst et al. ................... | 455/450 |

(Continued)

FOREIGN PATENT DOCUMENTS

CN  1960556 A   5/2007
CN  101594321 A  12/2009

OTHER PUBLICATIONS

Wolfle, G., et al., "Field Strength Prediction in Indoor Environment with Neural Networks", IEEE 47th Vehicular Technology Conference, May 4, 1997, pp. 82-86, vol. 1, IEEE, Phoenix, AZ.

(Continued)

*Primary Examiner* — Brenda H Pham
(74) *Attorney, Agent, or Firm* — Vincent J. Allen; Stephen Y. Liu; Carstens & Cahoon, LLP

(57) ABSTRACT

The present invention discloses a channel predicting method and apparatus in a communication network comprising a time-varying wireless channel. The channel predicting method comprising: determining a prediction strategy; selecting a certain number of channel samples from candidate channel samples each corresponding to one symbol in time domain in accordance with the prediction strategy; determining prediction weights in accordance with the prediction strategy and statistical properties of the time-varying wireless channel; and weighting the selected channel samples with the determined prediction weights to obtain a predicting channel sample as a prediction result.

24 Claims, 17 Drawing Sheets

(56) References Cited

U.S. PATENT DOCUMENTS

2005/0276357 A1* 12/2005 Wang .................. 375/340
2008/0240260 A1 10/2008 Heidari et al.

OTHER PUBLICATIONS

Bello, B., "Characterization of Randomly Time-Variant Linear Channels", IEEE Transactions on Communications Systems, Dec. 1, 1963, pp. 360-393, vol. 11, Issue 4, IEEE.

Gannot, S., et al., "Tracking a MIMO Channel Singular Value Decomposition via Projection Approximation", IEEE 24th Convention of Electrical and Electronics Engineers in Israel, Nov. 1, 2006, pp. 91-94, IEEE, Eilat, Israel.

Sun, J., et al., "Nonlinear Prediction of Mobile-Radio Fading Channel Using Recurrent Least Squares Support Vector machines and Embedding Phase Space", International Conference on Communications, Circuits and Systems, Jun. 27, 2004, 282-286, vol. 1, IEEE.

Schafhuber, D., et al., "MMSE and Adaptive Prediction of Time-Varying Channels for OFDM Systems", IEEE Transactions on Wireless Communications, Mar. 1, 2005, pp. 593-602, IEEE Communications Society.

Seyfi, M., et al., "An LMS-like Predictive Estimation for Fading MIMO Channels", The 18th Annual IEEE International Symposium on Personal, Indoor and Mobile Radio Communications, Sep. 3, 2007, pp. 1-5, IEEE.

Min, C., et al., "MIMO-OFDM Downlink Channel Prediction for IEEE802.16e Systems Using Kalman Filter", IEEE Wireless Communications and Networking Conference, Mar. 11, 2007, pp. 942-946, IEEE.

* cited by examiner

मेथड AND APPARATUS FOR CHANNEL PREDICTING

METHOD AND APPARATUS FOR CHANNEL PREDICTING

TECHNICAL FIELD

The present invention relates to communication technology, and more particularly, to a method and apparatus for channel predicting in a communication network.

BACKGROUND

Currently, channel prediction that utilizes previous channel samples to obtain up-to-date channel in the presence of time variation is attracting enormous research effort and has become one of the key features in wireless communication system design.

SUMMARY

The present invention proposes a method and apparatus for channel predicting in a communication network.

In an aspect of the invention, there is provided a channel predicting method in a communication network comprising a time-varying wireless channel, the method comprising: determining a prediction strategy; selecting a certain number of channel samples from candidate channel samples each corresponding to one symbol in time domain in accordance with the prediction strategy; determining prediction weights in accordance with the prediction strategy and statistical properties of the time-varying wireless channel; and weighting the selected channel samples with the determined prediction weights to obtain a predicting channel sample as a prediction result.

In another aspect of the invention, there is proposed a channel predicting apparatus in a communication network comprising a time-varying wireless channel, the apparatus comprising: a prediction strategy determination unit configured to determine a prediction strategy; a first selection unit configured to select a certain number of channel samples from candidate channel samples each corresponding to one symbol in time domain in accordance with the prediction strategy; a prediction weights determination unit configured to determine prediction weights in accordance with the prediction strategy and statistical properties of the time-varying wireless channel; and a weighting unit configured to weight the selected channel samples with the determined prediction weights to obtain a predicting channel sample as a prediction result.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which.

DETAILED DESCRIPTION OF PREFERRED EMBODIMENTS

In the following detailed description, reference is made to the accompanying drawings, which form a part thereof. In the following description, some embodiments are used for the purpose of description only, which shall not be understood as any limitation to the present application but the examples thereof. While it may blur the understanding of the present invention, the conventional structure or construction will be omitted.

Various mathematical models have been introduced in channel prediction in order to fit the variation in the time-varying wireless channel. In the sense of linearity, these mathematical models can be divided into 2 types: linear model and nonlinear model. The most commonly used model in linear channel prediction is auto-regression (AR) model, within which previous channel samples are used as input samples and endowed with different weights according to their respective relevance to the predicting one. Prediction weights can be adjusted adaptively, using Normalized Least Mean Square (NLMS) algorithm, Recursive Least Square (RLS) algorithm, or their variations (References [1]-[4]). In stream based transmission, the adjustment is performed continuously based on consecutive channel samples always known in the date stream. In block base transmission, the adjustment is performed pseudo-continuously based on consecutive channel samples only known in the training period so that the resulted model could fit the channel variation and thus be used to predict the following channels. A conventional adaptive channel predicting method is portrayed in FIG. 1.

Figure 2:
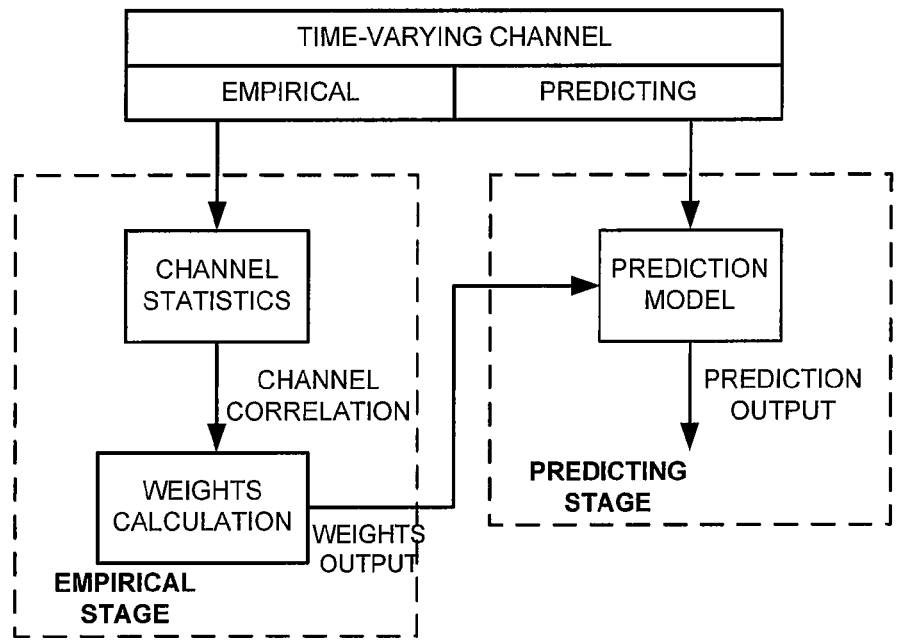
FIG. 2 is a block diagram of the general structure for the conventional empirical channel predictor.

As an alternative, prediction weights can also be obtained from channel correlations. The most straightforward approach is to analyze channel correlations empirically (References [5]-[6]). In another word, the correlations are summarized and calculated through the time-average of large amount of channel samples. In consequence, the prediction model that could fit the channel variation is obtained. A general structure for a typical empirical channel predictor is illustrated in FIG. 2.

On the other hand, nonlinear channel prediction adopts models like Projection Approximation Subspace Tracking (PAST) (Reference [7]), Neural Networks (NNs) (Reference [8]), Support Vector Machine (SVM) (Reference [9]) and so on.

The nonlinear channel prediction methods mentioned above contain very complicated operations and processes, and thus cause great challenge to practical feasibility. On the other hand, the AR model is rather easy to implement, while possessing excellent fitting effect as well as long fitting range. These obvious advantages over the nonlinear models lead to the fact that most existing solutions to channel prediction select the AR model as their prediction models. For this reason, embodiments of the present application will mainly be concentrated on the channel prediction related to the AR model.

In most communication systems, data signals or data streams are divided into data blocks for the sake of convenient storing, processing and transmitting. Different data symbols within any data block possess different positions, named the positional diversity, which causes that their respective relevance to the already known channel samples may be different. The existing channel predictors, however, fail to make use of this positional diversity of the block based data structures. This often leads to some problems such as the failure to achieve the anticipated prediction performance, or the occurrence of significant prediction performance degradation on certain data symbols, and thus weaken the corresponding prediction effect in practical communication systems.

Figure 1:
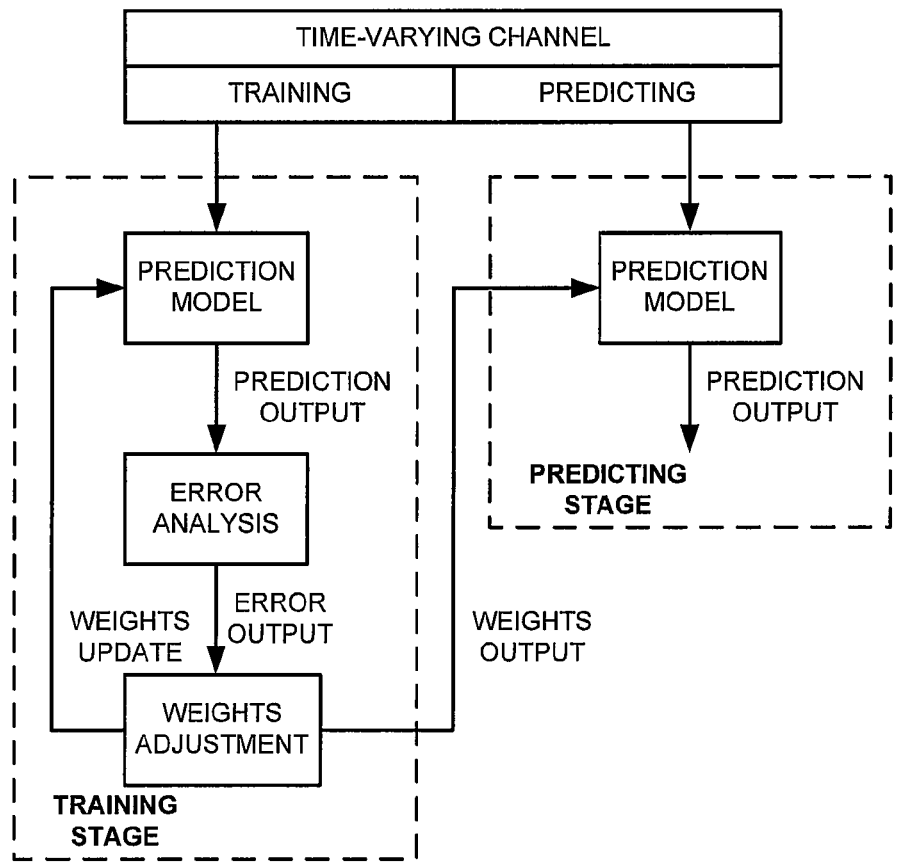
FIG. 1 is a block diagram of the general structure for the conventional adaptive channel predictor.

As for the existing adaptive channel predictor, several notable disadvantages that greatly constraint its usage are illustrated as follows:

1. As can be seen in FIG. 1, the training stage is mandatory for the acquisition of model weights that could fit the channel variation. The training stage in the existing system increases both system complexity and processing latency;
2. Prediction weights need very long adjustment to achieve convergence. Otherwise, they are easily outdated and cannot catch up with the time variation. Apparently, the long adjustment needs large amount of consecutive channel samples, which can be readily satisfied in the block based transmissions with abundant acquisition of consecutive data blocks, while it is almost impossible where only a few consecutive data blocks can be obtained. Example for the former is the frequency division duplex (FDD) communication system, and the example for the latter is the time division duplex (TDD) communication system;
3. The adaptive channel predictor is merely a short range adaptation to the time variation and may not be applicable in a long range statistical sense. Consequently, provided that the prediction weights are not given sustained adjustments, the prediction error may increase notably as the prediction continues, even if the weights are obtained from an adequate training stage.

As for the existing empirical channel predictor, several notable disadvantages that greatly constraint its usage are illustrated as follows:

1. Very large amount of channel samples need to be stored in memory in order to analyze the channel correlations, which lead to great memory occupation, large processing load and latency;
2. Channel correlations are obtained using time-average and need to be updated periodically in order to catch up with the channel variation. Considerable increase in processing load and decrease in effective prediction duration then come about;
3. The prediction performance is not so attractive compared to other linear channel predictors.

In order to overcome at least one of the mentioned weaknesses of the existing solutions, an embodiment of the present application proposes a channel predicting apparatus in a communication network.

Figure 3:
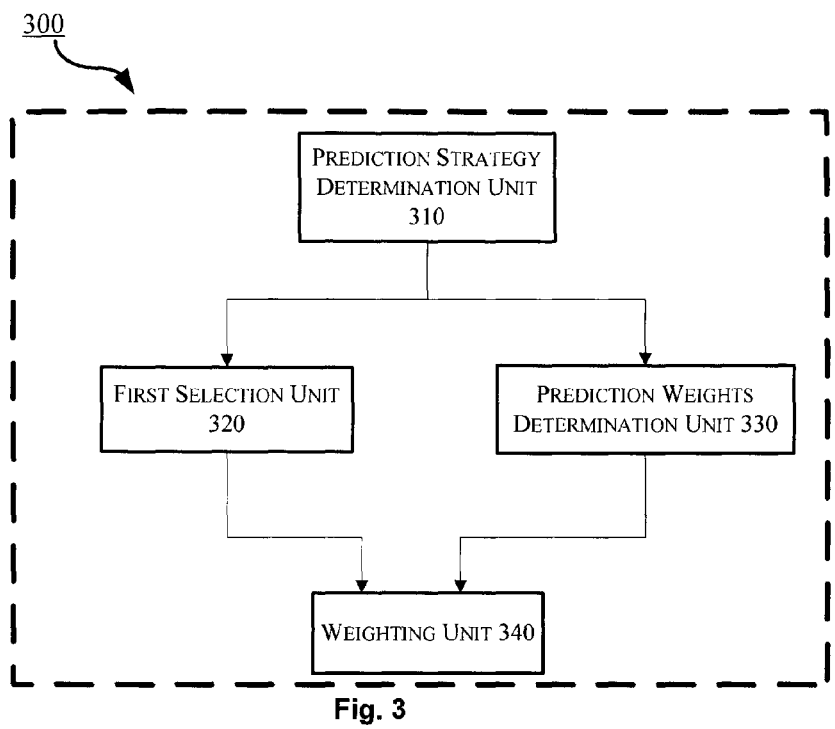
FIG. 3 is a block diagram of a channel predicting apparatus according to an embodiment of the present application.

FIG. 3 is a block diagram of the channel predicting apparatus 300 according to an embodiment of the present invention. The apparatus 300 operates in a communication network comprising a time-varying wireless channel. In this context, the apparatus 300 can be any node in the network which is capable of channel predicting, such as but not limited to a base station or a mobile station.

As shown, the apparatus 300 comprises a prediction strategy determination unit 310, a first selection unit 320, a prediction weights determination unit 330, and a weighting unit 340. It can be appreciated by those skilled in the art that the apparatus 300 may further comprise other units/components necessary for the operation of the apparatus, whose description is omitted here so as not to obscure the concept of the present invention. Also, each of the units 310 to 340 can be implemented in hardware, firmware or software, i.e., by a dedicated circuit component or by an appropriately programmed processor.

The prediction strategy determination unit 310 is configured to determine a prediction strategy.

The first selection unit 320 is configured to select a certain number of channel samples from candidate channel samples each corresponding to one symbol in time domain in accordance with the prediction strategy.

The prediction weights determination unit 330 is configured to determine prediction weights in accordance with the prediction strategy and statistical properties of the time-varying wireless channel.

The weighting unit 340 is configured to weight the selected channel samples with the determined prediction weights to obtain a predicting channel sample as a prediction result.

According to the embodiment of the present application, the prediction accuracy and range may be improved with compared to the existing solutions.

In the present application, "symbol" denotes one symbol in time domain, to which each channel sample corresponds. Channel sample on each symbol can be a vector, with the dimension being the number of different frequencies. Under this circumstance, both time and frequency correlation can be utilized. Alternatively, channel sample on each symbol can also be a scalar. Under this circumstance, only the time correlation will be utilized.

Figure 4:
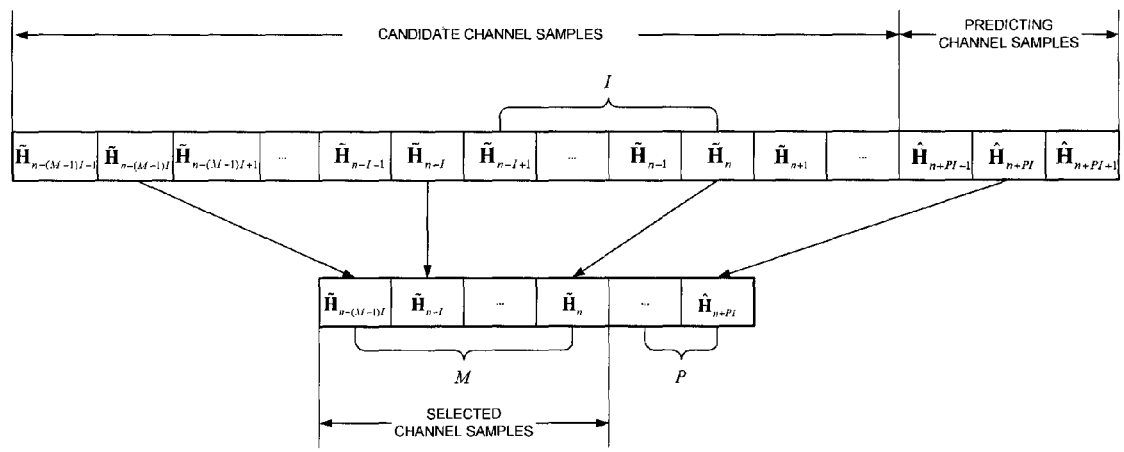
FIG. 4 is a diagram illustrating the prediction strategy.

Furthermore, as illustrated in FIG. 4, channel samples may be divided into two categories:

1. The predicting channel samples, which are to be predicted by channel prediction and can be also called as unknown channel samples; and
2. The candidate channel samples, which denote a pool of channel samples, from which the selected channel samples (also called as the obtained channel samples) come, and which can also be called as known channel samples.

By way of a non-limiting example, the candidate channel samples may comprise previously predicted channel samples.

With FIG. 3 in mind, and by way of non-limiting examples, the operations and functions of the respective units in the apparatus 300 will be further detailed.

First of all, in order to facilitate understanding following description of the present disclosure the principle of a typical AR channel predictor will by described with reference to FIG. 5.

Figure 5:
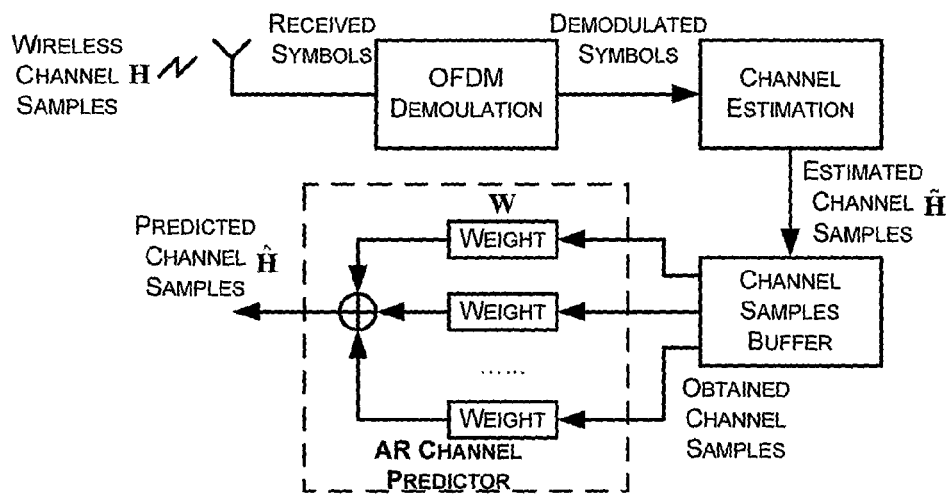
FIG. 5 is a block diagram of a typical AR channel predictor in an OFDM communication system.

As shown in FIG. 5, the AR channel predictor obtains the predicting channel samples from the sum of the selected channel samples which are weighted according to their respective relevance to the predicting one:

$$\hat{H}_n = \sum_m W_m \tilde{H}_{n-m}, \quad \text{Eq. (1)}$$

where input channel samples $\tilde{H}_{n-m}$, are the previously estimated channel vector samples, each of which consists of the estimated channel frequency responses $\tilde{H}_{k,n-m}$, k=1, 2, ..., K on K separate sub-carriers:

$$\tilde{H}_{k,n-m} = H_{k,n-m} + \tilde{N}_{k,n-m} \quad \text{Eq. (2)}.$$

Here, $\tilde{N}_{k,n-m}$ denotes the estimation noise on the kth sub-carrier of the (n−m)th OFDM symbol. It is a wide-sense random variable and satisfies $\tilde{N}_{k,n-m} \sim N(0, \sigma_e^2)$.

Three other parameters are introduced into the above AR model, in order to facilitate the later illustration of the symbol-by-symbol and the consequent trellis prediction scheme.

M denotes the number of the selected channel samples, I denotes the distance between two contiguously selected channel samples in the candidate channel samples, and P denotes the distance between the predicting channel sample and the selected channel sample that is closest to the predicting channel sample, as shown in FIG. 4.

The modified AR channel predictor with prediction strategy (M,I,P) can be then obtained as:

$$\hat{H}_{n+PI} = \sum_{m=0}^{M-1} W_{mI} \tilde{H}_{n-mI}. \quad \text{Eq. (3)}$$

Under MMSE criterion, the target of the prediction is to minimize the prediction error defined as follows:

$$\epsilon_{n+PI} \triangleq E\{\|H_{n+PI} - \hat{H}_{n+PI}\|_2^2\} \quad \text{Eq. (4)}.$$

The optimal model weights $$(W_0, W_I, \ldots, W_{(M-1)I})_{opt} = \underset{(W_0, W_I, \ldots, W_{(M-1)I})}{\operatorname{argmin}} \epsilon_{n+PI}$$

that represent the relevance between the selected channel samples and the predicting ones, can be derived using orthogonal principle (Reference [10]) for m=0, 1, ... m−1:

$$E\{(H_{n+PI} - \hat{H}_{n+PI})\tilde{H}_{n-mI}\} = 0 \quad \text{Eq. (5)},$$

and thus yields the Wiener-Hopf equation:

$$E\{H_{n+PI} H_{n-mI}^H\} = \sum_{m'=0}^{M-1} W_{m'I} (E\{H_{n-m'I} H_{n-mI}^H\} + E\{\tilde{N}_{n-m'I} \tilde{N}_{n-mI}^H\}). \quad \text{Eq. (6)}$$

The corresponding matrix form of the above equation can be derived as:

$$(W_0, W_I, \ldots, W_{(M-1)I}) = (R_{PI}, R_{(P+1)I}, \ldots, R_{(P+M-1)I}) \quad \text{Eq. (7)}$$

$$\begin{pmatrix} R_0 + \sigma_e^2 & R_I & \cdots & R_{(M-1)I} \\ R_I & R_0 + \sigma_e^2 & \cdots & R_{(M-2)I} \\ \vdots & \vdots & \ddots & \vdots \\ R_{(M-1)I} & R_{(M-2)I} & \cdots & R_0 + \sigma_e^2 \end{pmatrix},$$

and a more compact form can thus be achieved as:

$$W = \Pi(R + \sigma_e^2 I)^{-1} \quad \text{Eq. (8)}$$

by introducing the identity matrix $I \in \mathbb{C}^{KM \times KM}$, the Toeplitz correlation matrix $R_{mI} \triangleq E\{H_n H_{n-mI}^H\} \in \mathbb{C}^{K \times K}$, the model weights matrix $W \triangleq (W_0, W_1, \ldots, W_{(M-1)I}) \in \mathbb{C}^{K \times KM}$, the correlation matrix $\Pi \triangleq (R_{PI}, R_{(P+1)I}, \ldots, R_{(P+M-1)I}) \in \mathbb{C}^{K \times KM}$, and the block Toeplitz correlation matrix $R \in \mathbb{C}^{KM \times KM}$ with first block row $(R_0, R_1, \ldots, R_{(M-1)I})$.

The model weights matrix w obtained from Eq. (8) depends solely on the correlation matrices $R_{mI}$ for m=0, 1, ... M−1 and the estimation noise energy $\sigma_e^2$.

[Operations and Functions of the Prediction Weights Determination Unit 330]

In this embodiment, the prediction weights determination unit 330 determines prediction weights in accordance with the prediction strategy determined by the prediction strategy determination unit 310 and statistical properties of the time-varying wireless channel.

By way of a non-limiting example, the prediction weights determination unit 330 may comprise: a first calculation unit (not shown) configured to calculate prediction weights corresponding to all possible prediction strategies based on the statistical properties in advance; and a second selection unit (not shown) configured to select a prediction weight corresponding to the determined prediction strategy.

By way of another non-limiting example, the prediction weights determination unit 330 may comprise a second calculation unit (not shown) configured to calculate the prediction weights based on the statistical properties in accordance with the determined prediction strategy.

By way of a non-limiting example, the statistical properties of the time-varying wireless channel mainly include spaced-frequency spaced-time correlations (Reference [11]). By way of a non-limiting example, the spaced-frequency spaced-time correlations are mainly based on a delay power spectrum and a spaced-time correlation function of the time-varying wireless channel.

In understanding calculation of the prediction weights according to the embodiment of the present application in more detail, it is helpful to present derivation of the weights based on the spaced-frequency spaced-time correlations.

Most practical wireless channels can be modeled as a random Rayleigh fading channel satisfying the wide-sense stationary uncorrelated scattering (WSSUS) assumption (Reference [12]). The following derivation will be under such an assumption, but not limited to this.

Under the WSSUS assumption, the autocorrelation function of the time-varying impulse response of this channel satisfies:

$$E\{h(\tau_1, t_1)h^*(\tau_2, t_2)\} = \sqrt{r_h(\tau_1)r_h(\tau_2)} r_h(t_1, t_2) \delta(\tau_1 - \tau_2) \quad \text{Eq. (9)}$$

where $h(\tau, t)$ is the impulse response of the channel on delay $\tau$ at time t, $r_h(\tau)$ is the delay power spectrum of the channel defined as:

$$r_h(\tau) \triangleq r_h(\tau; 0) = E\{h(\tau, t) h^*(\tau, t)\} \quad \text{Eq. (10)},$$

and $r_h(t_1, t_2)$ is the spaced-time correlation function defined as:

$$r_h(t_1, t_2) \triangleq r_h(0; t_1, t_2) = E\{h(\tau, t_1) h^*(\tau, t_2)\} \quad \text{Eq. (11)}.$$

The spaced-frequency spaced-time correlations function (Reference [11]) of the channel can be subsequently derived as:

$$E\{H(f_1, t_1) H^*(f_2, t_2)\} = E\left\{\int_0^{\tau_{1,max}} h(\tau_1, t_1) e^{-j2\pi f_1 \tau_1} d\tau_1 \left(\int_0^{\tau_{2,max}} h(\tau_2, t_2) e^{-j2\pi f_2 \tau_2} d\tau_2\right)^*\right\} = \quad \text{Eq. (12)}$$

$$r_h(t_1, t_2) \int_0^{\tau_{max}} r_h(\tau) e^{-j2\pi(f_1-f_2)\tau} d\tau.$$

Here, H(f,t) is the frequency response of the channel on frequency f at time t, and $\tau_{max}$ denotes the maximal channel delay. With T representing the duration of one OFDM symbol and $\Delta f$ representing the interval between two adjacent sub-carriers, the discrete-time equivalence of the above continuous-time spaced-frequency spaced-time correlations function can be achieved as:

$$E\{H[k_1, n_1]H^*[k_2, n_2]\} = \quad \text{Eq. (13)}$$
$$E\{H(f_1, t_1)H^*(f_2, t_2)\}|_{f_1=k_1\Delta f, f_2=k_2\Delta f, t_1=n_1T, t_2=n_2T} =$$
$$r_h(n_1T, n_2T) \int_0^{\tau_{max}} r_h(\tau)e^{-j2\pi(k_1-k_2)\Delta f\tau} d\tau.$$

As can be seen in Eq. (13), both the delay power spectrum $r_h(\tau)$ and the spaced-time correlation function $r_h(t_1,t_2)$ have important effects on the channel statistic, while they vary in different communication scenarios. Generally speaking, the delay power spectrum obeys the exponential distribution in most radio transmission media (Reference [13]):

$$r_h(\tau) = \frac{e^{-(\tau/\tau_{rms})}}{\tau_{rms}(1 - e^{-(\tau_{max}/\tau_{rms})})}, 0 \le \tau \le \tau_{max}, \quad \text{Eq. (14)}$$

with $\tau_{rms}$ denoting the mean delay spread of the channel in the specified scenario, and the spaced-time correlation function can be appropriately described using the zero-order Bessel function of the first kind (Reference [14]):

$$r_h(t_1,t_2)=J_0(2\pi f_D|t_1-t_2|) \quad \text{Eq. (15),}$$

where $f_D$ denotes the maximal Doppler frequency, which may be expressed as:

$$f_D = \frac{vf_c}{c}, \quad \text{Eq. (16)}$$

with v as the velocity of the MS, $f_c$ as the carrier frequency and c as the velocity of the light.

As a result, the spaced-frequency spaced-time correlations function can be further derived as:

$$E\{H[k_1, n_1]H^*[k_2, n_2]\} = \quad \text{Eq. (17)}$$
$$J_0(2\pi f_D|n_1 - n_2|T) \frac{1 - e^{-[1+j2\pi(k_1-k_2)\Delta f\tau_{rms}](\tau_{max}/\tau_{rms})}}{(1 - e^{-\tau_{max}/\tau_{rms}})[1 + j2\pi(k_1 - k_2)\Delta f\tau_{rms}]}.$$

Consequently, the Toeplitz spaced-frequency spaced-time correlations matrix $R_{ml}$, can be computed as $$R_{ml} = E\{H_n H_{n-ml}^H\} = \quad \text{Eq. (18)}$$
$$\begin{pmatrix} E\{H[1, n]H^*[1, n - ml]\} & \cdots & E\{H[1, n]H^*[K, n - ml]\} \\ \vdots & \ddots & \vdots \\ E\{H[K, n]H^*[1, n - ml]\} & \cdots & E\{H[K, n]H^*[K, n - ml]\} \end{pmatrix},$$

and finally, the model weights matrix W is analytically obtained using Eq. (8).

Thus, with the above derivation, one sees that the prediction weights may be calculated based on Eq. (18). By way of a non-limiting example, the prediction weights may be calculated by steps of: obtaining the maximal Doppler frequency by Eq. (16); obtaining the maximal channel delay from synchronization; obtaining the estimation noise energy from the conventional channel estimation process; obtaining the Toeplitz spaced-frequency spaced-time correlations matrix by using Eq. (18); and obtaining the weights matrix for the specified scenario by using Eq. (8).

[Operations and Functions of the Prediction Strategy Determination Unit 310]

Figure 6:
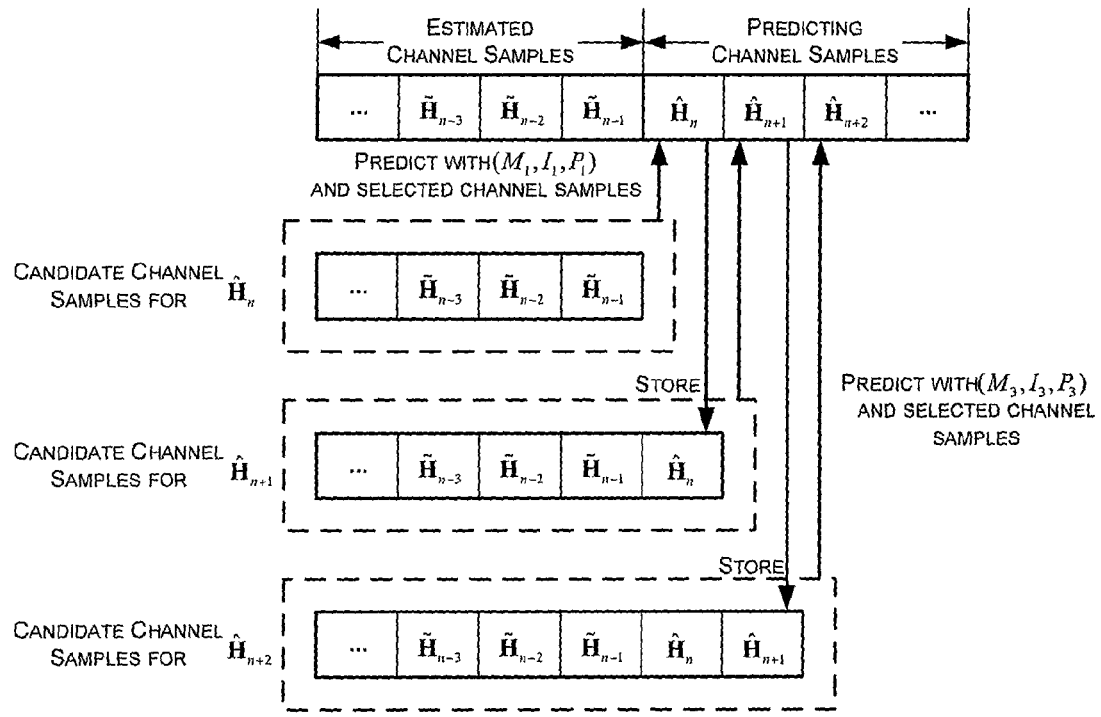
FIG. 6 is a diagram illustrating a symbol-by-symbol prediction scheme according to an embodiment of the present application.

By way of non-limiting, the channel prediction according to the present application may be performed symbol by symbol. Specifically, a symbol-by-symbol prediction scheme may be used in this embodiment. The general idea of the symbol-by-symbol prediction scheme is that the predictions of the predicting channel samples on different symbols within any data block are processed individually one by one. In details, a predicting channel sample on any symbol is given a prediction model with customized strategy according to its particular positional condition. For different symbols, the customized strategy may be different or same, depending on practical need. A predicted channel sample is thus produced and stored, which becomes a candidate channel sample for the predicting channel samples on the following symbols. The inclusion of this previously predicted channel sample as the candidate ones helps to shorten the distance between the predicting channel samples and the candidate ones, and may thus help to enhance prediction accuracy on the following symbols. An illustration of the symbol-by-symbol prediction scheme is shown in FIG. 6.

The predicting channel sample $\hat{H}_n$ is predicted with strategy $(M_1,I_1,P_1)$ and the corresponding channel samples selected from the candidate channel samples $(\ldots, \tilde{H}_{n-3}, \tilde{H}_{n-2}, \tilde{H}_{n-1})$. Then, $\hat{H}_n$ is stored as a candidate channel sample for the following predicting channel samples such as $\hat{H}n+1$ and $\hat{H}_{n+2}$. The next predicting channel sample $\tilde{H}_{n+1}$ repeats the above process but with different strategy $(M_2,I_2,P_2)$ and corresponding channel samples selected from the updated candidate channel samples $(\ldots, \tilde{H}_{n-3}, \tilde{H}_{n-2}, \tilde{H}_{n-1}, \hat{H}_n)$. This prediction process goes recursively for all the following predicting channel samples. Without confusion, the obtained channel samples $\tilde{H}$ in the prediction model as presented in Eq. (3) may also contain the already predicted channel samples $\hat{H}$. Thus, the prediction model in Eq. (3) can still apply without change.

Figure 7:
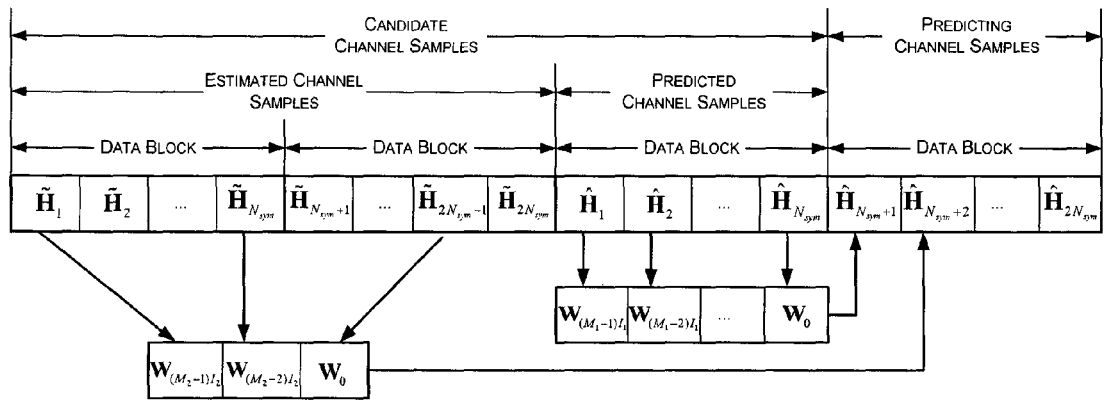
FIG. 7 is a diagram illustrating an of the symbol-by-symbol prediction scheme implemented in a block based transmission.

The symbol-by-symbol prediction scheme is very easy to be implemented on the data structures of any practical block based transmission. A very simple example is depicted in FIG. 7.

In the example above, one strategy $(M_1,I_1,P_1)$ may be used in predicting $\hat{H}_{N_{sym}+1}$, where $N_{sym}$ previously predicted channel samples $(\hat{H}_1, \hat{H}_2, \ldots, \hat{H}_{N_{sym}})$ are utilized as the selected channel samples. On the other hand, a distinct strategy $(M_2, I_2, P_2)$ may be adopted in predicting $\hat{H}_{N_{sym}+2}$, which takes three estimated channel samples $(\tilde{H}_1, \tilde{H}_{N_{sym}}, \tilde{H}_{2N_{sym}-1})$ as the selected channel samples. Obviously, the respective model weights for the above two predicting channel samples could be totally different.

By way of a non-limiting example, the prediction strategy on each symbol may be different. That is, a different set of the selected channel samples may be used in each prediction.

The following is about how to determine prediction strategy for each predicting channel sample.

By way of a non-limiting example, the prediction strategy determination unit 310 may comprises a training unit (not shown), which is configured to train some previous channel samples of the candidate channel samples in terms of respective prediction errors to determine the prediction strategy. Alternatively, the prediction strategy determination unit 310 may have no training unit.

By way of a non-limiting example, a trellis searching scheme may be used in the training unit for determining the optimal strategy for each symbol.

During the trellis searching scheme, the prediction solution for current symbol is denoted as the prediction strategies set determined till the current symbol. Then the prediction solution for the next symbol depends merely on the prediction solution for the current one, which means that the process of the prediction solution determination can be modeled as a Markov Chain. Candidate strategies ($M_i, I_i, P_i$) for the nth symbol can be defined as a state $S_{i,n}$, and apparently, the number of states $N_n$ for each symbol is bounded. The change from state on current symbol to state on next symbol is through state transition, and the accumulative state transitions until the ith state of the nth symbol can be defined as path $p_{i,n}$. As a result, the process of the prediction strategies determination for symbol-by-symbol prediction scheme can be described by a state trellis diagram shown in FIG. 8.

Figure 8:
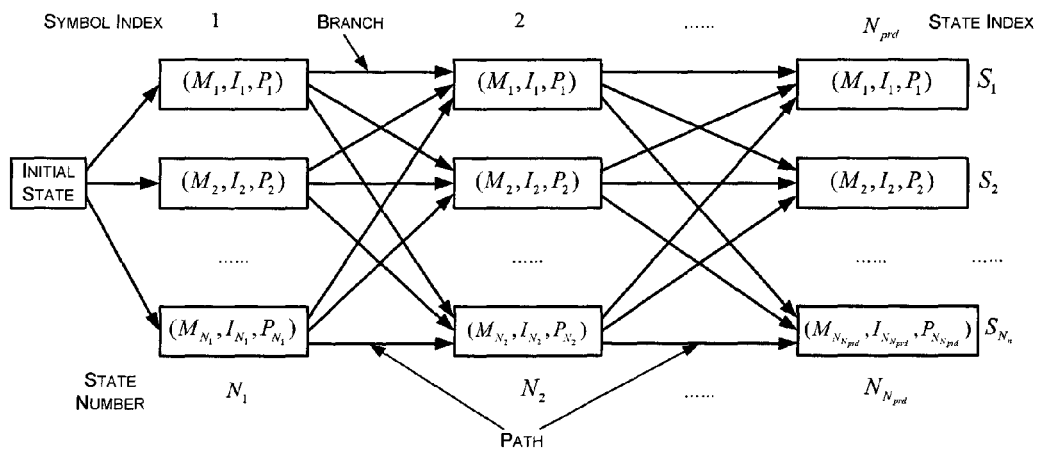
FIG. 8 is a trellis diagram for the symbol-by-symbol prediction scheme according to the embodiment of the present application.

In FIG. 8, prediction with certain strategy on one symbol is represented by a state transition between two contiguous symbols. This transition yields a predicted channel sample on this symbol and thus a corresponding prediction error, which is called in another word a branch error since any transition is a branch of one path. The branch error for any branches on the nth symbol is defined as $$brcErr_n = \|\hat{H}_n - H_n\|$$ Eq. (19)

A path is made up of transitions on all previous symbols, and thus owns an accumulative path error. The path error for any paths on the nth symbol is defined as $$pthErr_n = \sum_{n'=1}^{n} brcErr_{n'}.$$ Eq. (20)

The target of the prediction is to find the path $p=\{(M_1,I_1, P_1), \ldots, (M_{N_{prd}}, I_{N_{prd}}, P_{N_{prd}})\}$ that has the minimal accumulative path error $pthErr_{N_{prd}}$ along all $N_{prd}$ symbols. This path searching is accomplished within the training stage, where predictions are performed on the candidate channel samples so that the average prediction error can be acquired and used as the branch error. Each state (M,I,P) contained in the selected path is then used as the prediction strategy for each symbol respectively in the following predicting stage.

It shall be noted that the trellis prediction scheme as noted above is not limited to the prediction strategy (M, I, P), but may be applied to various other prediction strategies.

Obviously, the solution proposed in the above may enhance the prediction accuracy, alleviate the inherent error propagation of the AR based predictor and hence acquire the optimal prediction strategy.

By way of a non-limiting example, under the circumstance of multiple data blocks, the branch error defined in Eq. (19) may be the average prediction error on all the nth symbols within different data blocks. In order to clarify this point, the detailed description will be provided with reference to FIG. 9.

Figure 9:
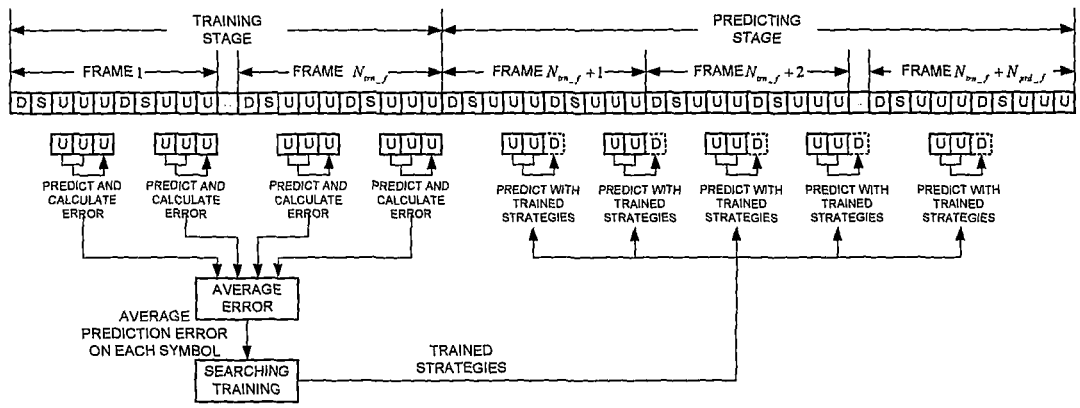
FIG. 9 is a diagram illustrating an example of the prediction data scheme for the proposed channel predictor in TDD.

FIG. 9 shows an example illustrating the prediction data scheme for the proposed channel predictor in a TDD LTE communication system, whose frame structure is "DSU-UUDSUUU". Here, a "D" box denotes a DL subframe, a "U" box denotes a UL subframe and an "S" box denotes a special subframe. The boxes with solid borders denote the subframes containing the estimated channel samples, while the boxes with dashed borders denote the subframes containing the predicting channel samples. In this example, the term "subframe" is equivalent to the term "data block" mentioned earlier, and each subframe contains several OFDM symbols.

By way of a non-limiting example, with the prediction data scheme as shown in FIG. 9, in the training stage in the training unit of the prediction strategy determination unit 310, the channel vector samples on the "pretending" predicting OFDM symbols, which are in fact the candidate channel samples, are predicted as if they are unknown. Their predicted values are then compared with their true values to obtain their respective prediction error. The prediction error for the predicted channel sample on the "pretending" predicting OFDM symbol with the absolute symbol index n (i.e., the symbol index in the scope of all subframes) is measured using Frobenius Norm as a non-limiting example.

$$err_{k,n} = \|\hat{H}_{k,n} - H_{k,n}\|_F$$ Eq. (21)

$$= \left\| \begin{pmatrix} \hat{H}_{11,k,n} - H_{11,k,n} & \hat{H}_{12,k,n} - H_{12,k,n} \\ \hat{H}_{21,k,n} - H_{21,k,n} & \hat{H}_{22,k,n} - H_{22,k,n} \end{pmatrix} \right\|_F$$

$$= \sqrt{\sum_{r=1}^{2} \sum_{t=1}^{2} |\hat{H}_{rt,k,n} - H_{rt,k,n}|^2}, n = 1, 2, \ldots,$$

where $k=1, 2, \ldots, K$ denotes the index of each subcarrier, and $H_{rt,k,n}$ denotes the corresponding channel sample on the single-input single-output (SISO) channel from the tth transmitting antenna to the rth receiving antenna. Here, the multi-antenna mode is assumed to be 2×2 MIMO. It will be appreciated by those skilled in the art that any other multi-antenna modes may be applied in the present application.

All channel vector samples on all "pretending" predicting OFDM symbols with the same relative symbol index within each subframe (i.e., the symbol index in the scope of each subframe) are predicted using the same prediction strategy because of their positional similarity. The average prediction error for the predicted channel vector samples on all "pretending" predicting OFDM symbols with the same relative symbol index s within each subframe can be defined as $$\mathrm{avr\_err}_s = \frac{1}{N_{trn\_sf} K} \sum_{sf=1}^{N_{trn\_sf}} \sum_{k=1}^{K} err_{k,s+(sf-1)N_{sym}},$$ Eq. (22)

$$s = 1, 2, \ldots, N_{sym}.$$

Here, $N_{trn\_sf}$ denotes the total number of training subframes and equates to $2N_{trn\_f}$ in the above example, where $N_{trn\_f}$ denotes the total number of training frames. $N_{sym}$ denotes the number of OFDM symbols in one subframe. The average prediction error defined in Eq. (22) will be used in trellis searching scheme to obtain the optimal or sub-optimal prediction strategies set, which contains the prediction strategies for the prediction of channel vector sample on each OFDM symbol within every subframe.

In the weighting process (also called as predicting stage) of the weighting unit 340, channel vector samples on predicting OFDM symbols are predicted using the obtained prediction strategies according to their relative symbol index within each subframe. In the above example, the training stage contains $N_{trn\_f}$ frames and the predicting stage contains $N_{prd\_f}$ frames.

Figure 10:
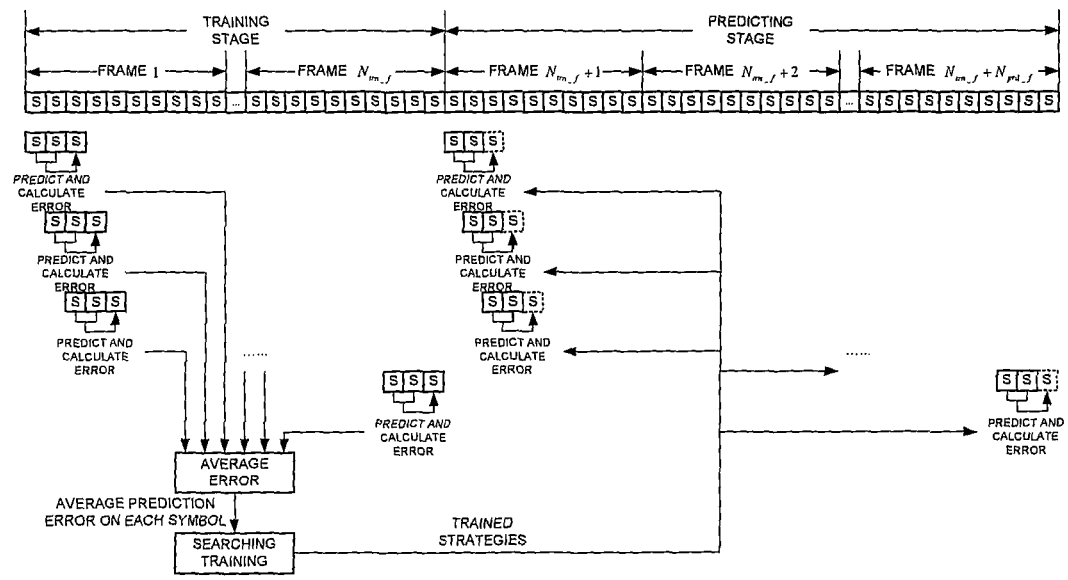
FIG. 10 is a diagram illustrating an example of the prediction data scheme for the proposed channel predictor in FDD.

FIG. 10 shows an example illustrating the prediction data scheme for the proposed channel predictor in a FDD LTE communication system. Here, a "S" box denotes a subframe. The similar handling as the above may be applied to the prediction data scheme as shown in FIG. 10.

As noted above, the proposed channel prediction may require fewer candidate channel samples for training than the existing ones, and achieve a better adaptation to the data structures and a broader versatility to the duplex mode (both TDD and FDD).

The following three specific ways may be used in the trellis searching (also called as trellis training) scheme.

1. Modified Viterbi Algorithm

Figure 11:
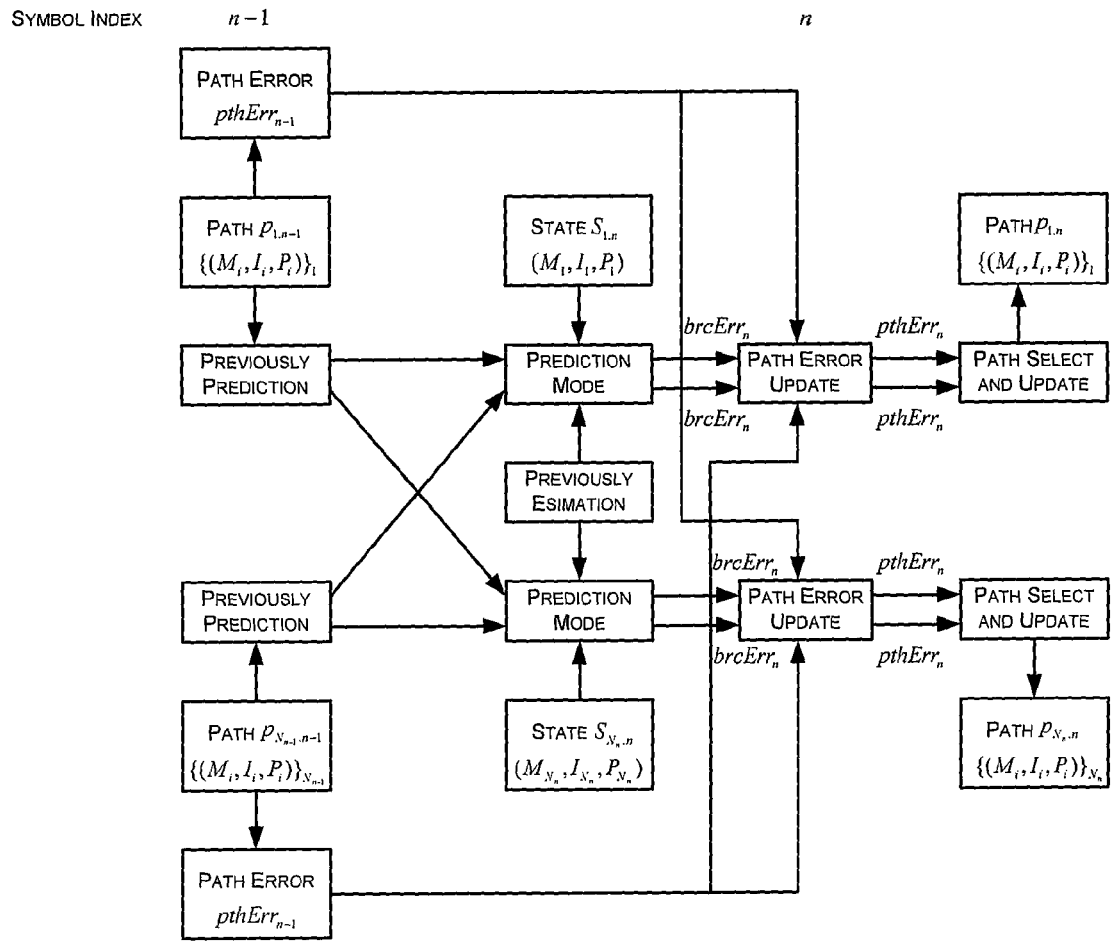
FIG. 11 is a diagram illustrating the modified Viterbi algorithm according to an embodiment of the present application.

Obviously, Viterbi algorithm can be modified to find the path that has the minimal accumulative prediction error, and hence to find the optimal prediction strategies set for all symbols. As can be seen in FIG. 8, at the nth symbol, $N_{n-1}$ paths $p_{j,n-1}$, j=1, 2, . . . , $N_{n-1}$ with different previously predicted symbols but the same current prediction strategy ($M_i$, $I_i$, $P_i$) merge at state $S_{i,n}$. Therefore, for each state at the nth symbol, $N_{n-1}$ branch error brcErr$_n$ can be obtained by using the AR channel predictor as described in the above. $N_{n-1}$ path error pthErr$_n$, which is the sum of the current branch error brcErr$_n$ and the corresponding previous path error pthErr$_{n-1}$, can be calculated. Then, the one path with the minimal path error is selected as the survival path for this state. The predicting, adding, comparing and selecting repeat for each state of this symbol so that $N_n$ survival paths could be obtained for this symbol. The process goes recursively for each of the following symbols. Finally, among all $N_{N_{prd}}$ survival paths $p_{i,N_{prd}}$, i=1, 2, . . . , $N_{N_{prd}}$ at the last symbol, the one with the minimal error is preserved and its path $P_{opt}=\{(M_1,I_1,P_1), \ldots, (M_{N_{prd}},I_{N_{prd}},P_{N_{prd}})\}$ is selected as the optimal prediction strategies set for the symbol-by-symbol prediction scheme. The diagram for the modified Viterbi algorithm is depicted in FIG. 11. In FIG. 11, the symbol index denotes a relative symbol index within each data block or subframe.

2. Least Path Error Algorithm

Figure 12:
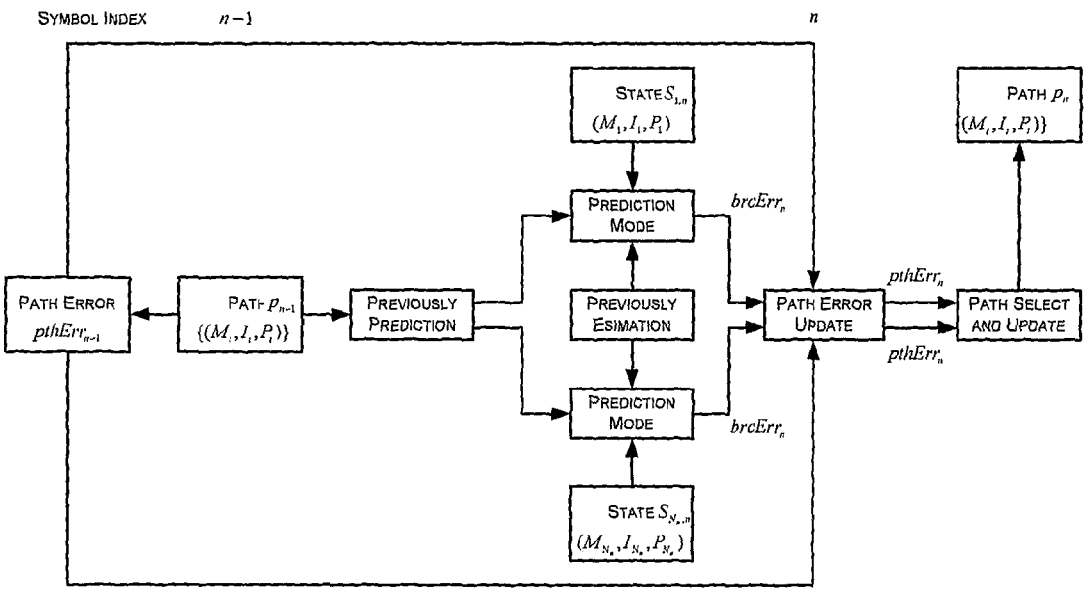
FIG. 12 is a diagram illustrating the LPE algorithm according to an embodiment of the present application.

Alternatively, a simplified version of the modified Viterbi algorithm, called the Least Path Error (LPE) algorithm, is developed to find the suboptimal prediction strategy for each symbol. The main difference from the modified Viterbi approach is that instead of preserving one survival path for every state at each symbol, the LPE approach preserves only one survival path at each symbol. At the nth symbol, each state has only one incoming path, and all of these incoming paths are from the same last survival path $p_{n-1}$. Thus for each state, only one branch error brcErr$_n$ is obtained and only one path error pthErr$_n$ is then calculated. The one path with the minimal path error is selected as the survival path for this symbol. The process goes recursively for each of the following symbols. Finally, the only survival path $p_{subopt}=\{(M_1,I_1,P_1), \ldots, (M_{N_{prd}},I_{N_{prd}},P_{N_{prd}})\}$ at the last symbol is selected as the suboptimal prediction strategies set for the symbol-by-symbol prediction scheme. The diagram for the LPE algorithm is depicted in FIG. 12. In FIG. 12, the symbol index denotes a relative symbol index within each data block or subframe.

This approach may not yield the optimal prediction strategies so it is suitable for applications whose requirements for prediction accuracy are not so demanding. In some scenarios of which the conditions are not severe, the prediction strategies selected by this suboptimal approach may come very close to or even surpass the ones selected by the above optimal modified Viterbi approach.

Obviously, the processing load of both the optimal and suboptimal approaches depends heavily on the number of states for each symbol, which indicates all the possible or the permitted candidate prediction strategies for that symbol. Thus, it is very flexible to adjust between the prediction performance and the processing load by restricting the candidate prediction strategies in different degrees.

3. Memory Increment Algorithm

In some circumstances, especially the low velocity and short memory cases, the prediction strategies could be predetermined. Use of all candidate channel samples while keeping I=1 and P=1 is able to yield a satisfactory prediction performance that to some degree comes close to the suboptimal one. By way of a non-limiting example, I and P are fixed, and M is incremented symbol by symbol. In return, the training stage is not needed and thus the processing complexity is considerably reduced. Therefore, this approach is particularly suitable for system that is very sensitive to processing load but is not very strict with the prediction accuracy.

[Operations and Functions of the First Selection Unit 320]

For example, as illustrated in FIG. 4, with the prediction strategy determined by the prediction strategy determination unit 310, the first selection unit 320 may selects M channel samples from the candidate channel samples.

[Operations and Functions of the Weighting Unit 340]

By way of non-limiting examples, the weighting unit 340 may weight the M channel samples selected by the first selection unit 320 with the prediction weights determined by the prediction weights determination unit 330, and then the predicting channel sample will be finally obtained.

Figure 13:
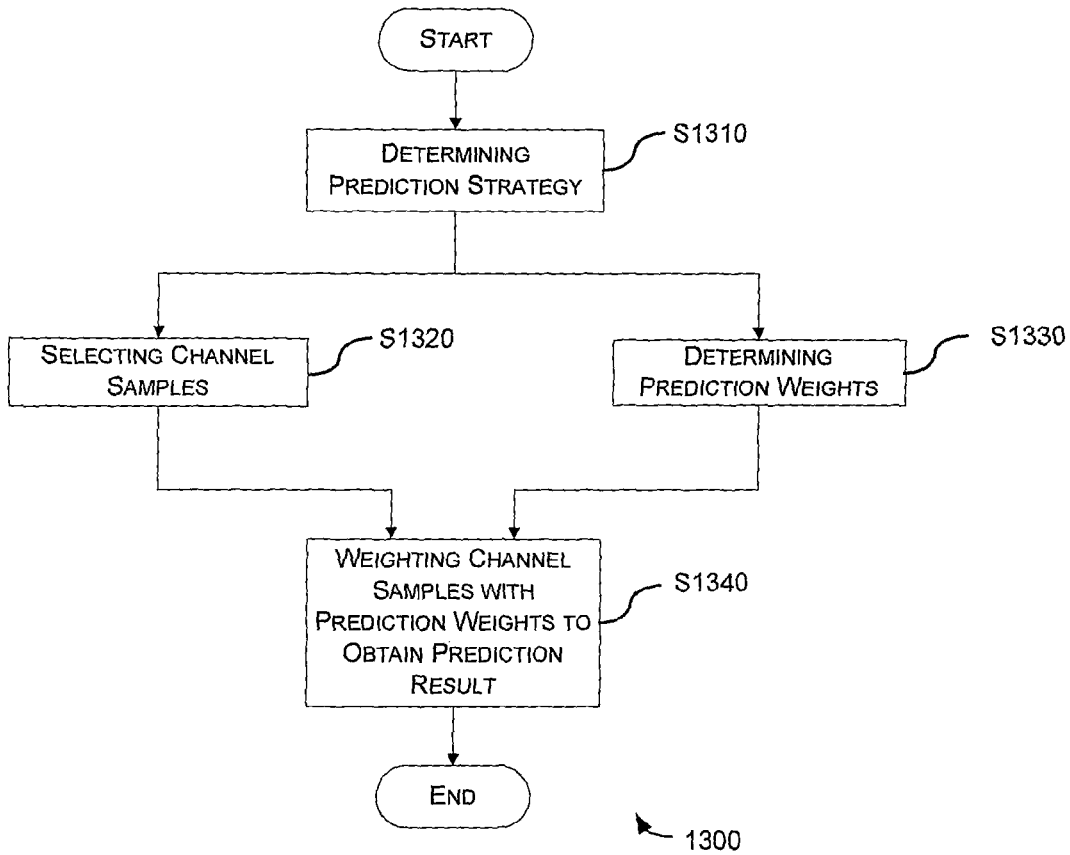
FIG. 13 is a flowchart illustrating a channel predicting method according to an embodiment of the present invention.

Reference is now made to FIG. 13, which is a flowchart illustrating a channel predicting method according to an embodiment of the present invention. The method 1300 can be carried out by any node in a network which is capable of channel predicting, such as but not limited to a base station or a mobile station.

The method starts from step S1310, where a prediction strategy is determined. After that, the method proceeds to step S1320, where a certain number of channel samples are selected from candidate channel samples each corresponding to one symbol in time domain in accordance with the prediction strategy. At step S1330, prediction weights are determined in accordance with the prediction strategy and statistical properties of the time-varying wireless channel. Finally, at step S1340, the selected channel samples are weighted with the determined prediction weights to obtain a predicting channel sample as a prediction result.

With FIG. 13 in mind, and by way of non-limiting examples, respective steps of the method 1300 will be further detailed with reference to FIG. 14, which illustrates an exemplary channel predicting process of the present application.

Figure 14:
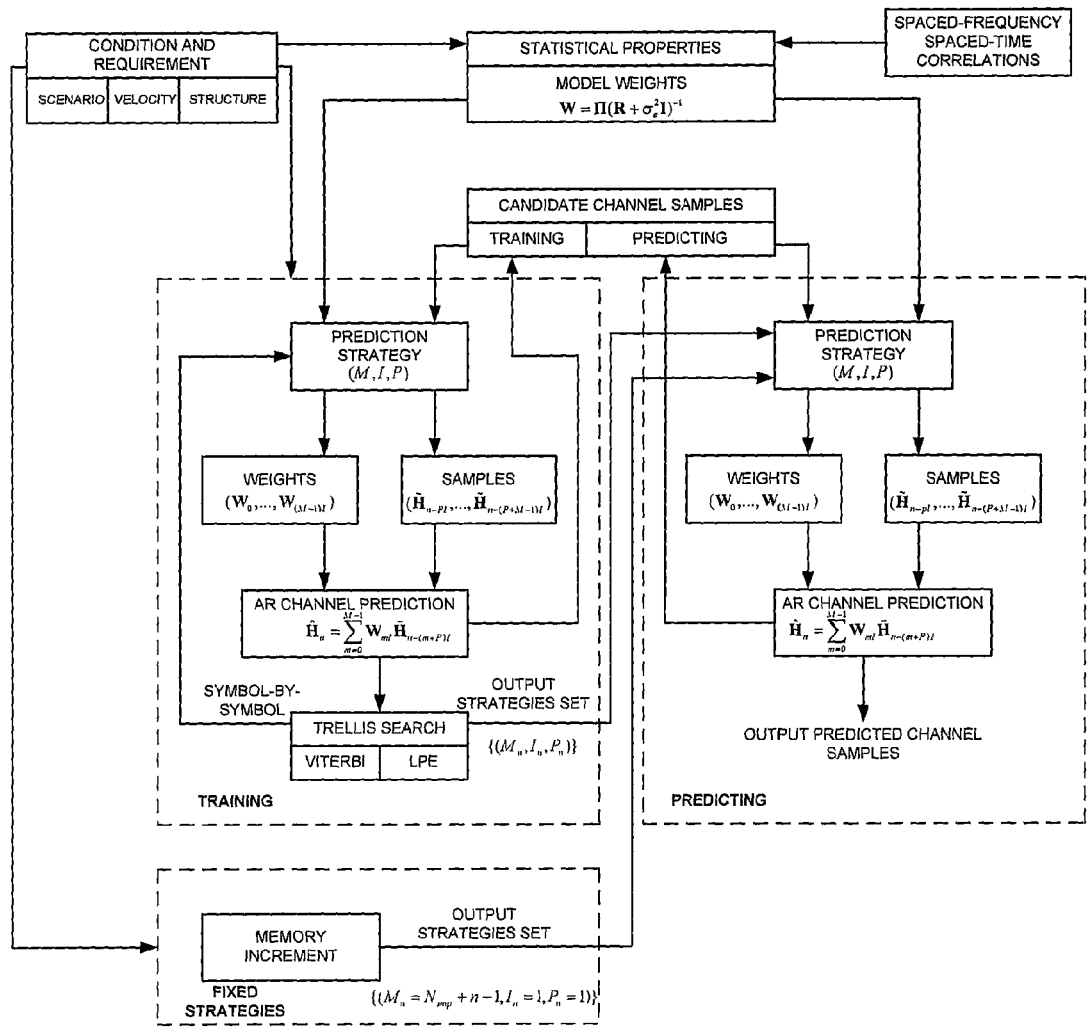
FIG. 14 is a diagram illustrating process of a symbol-by-symbol trellis AR channel predictor according to an embodiment of the present application.
Figure 15:
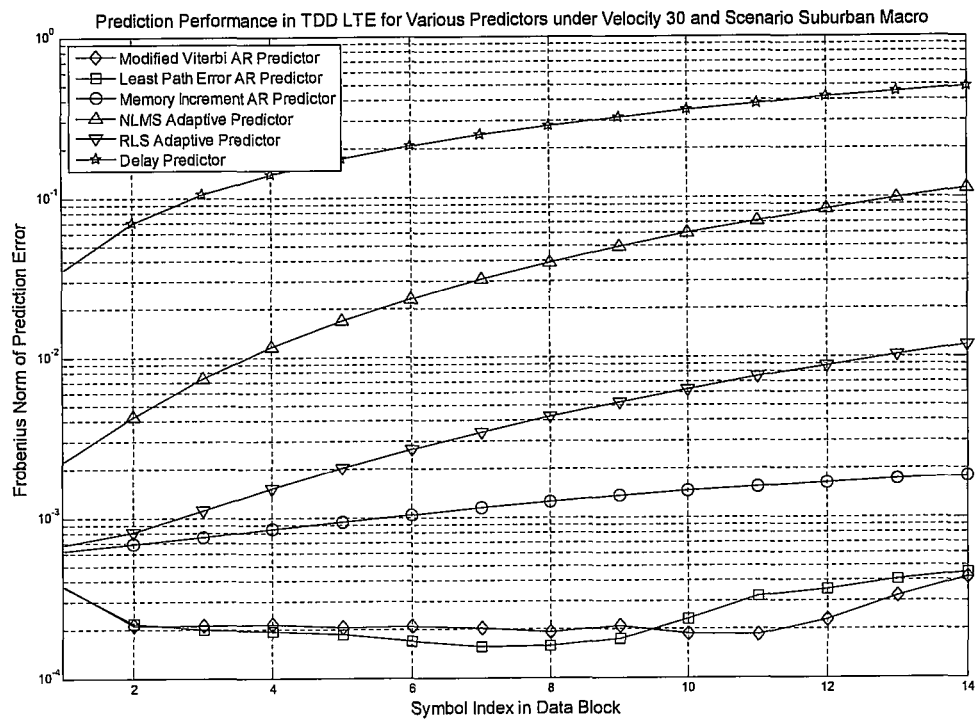
FIGS. 15-32 show simulation results in TDD/FDD LTE under Various Scenarios and Velocities.
Figure 16:
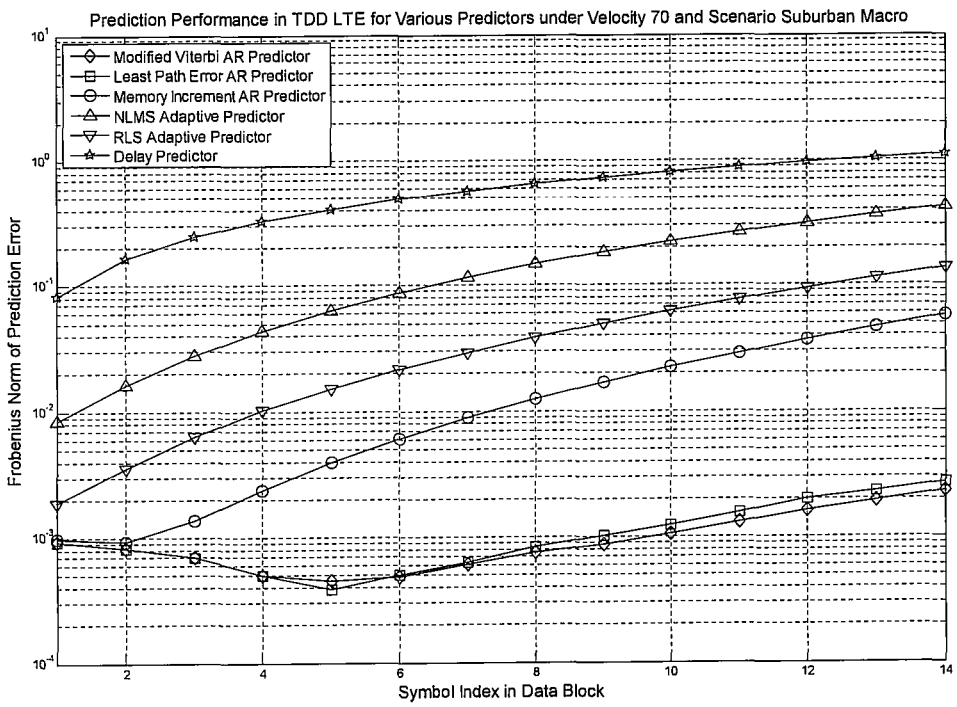
Figure 17:
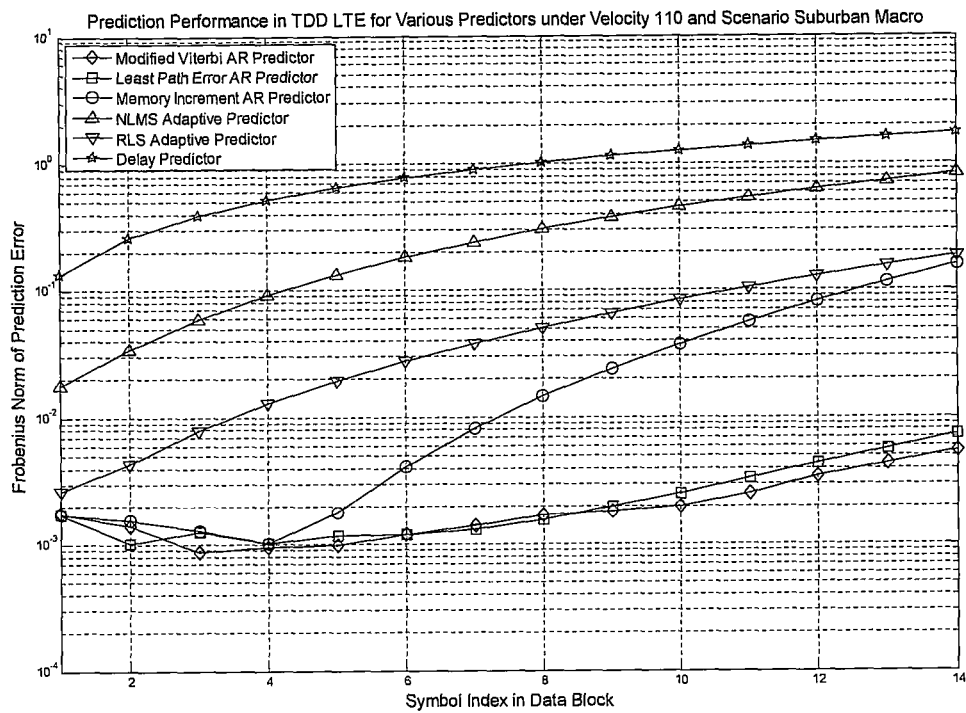
Figure 18:
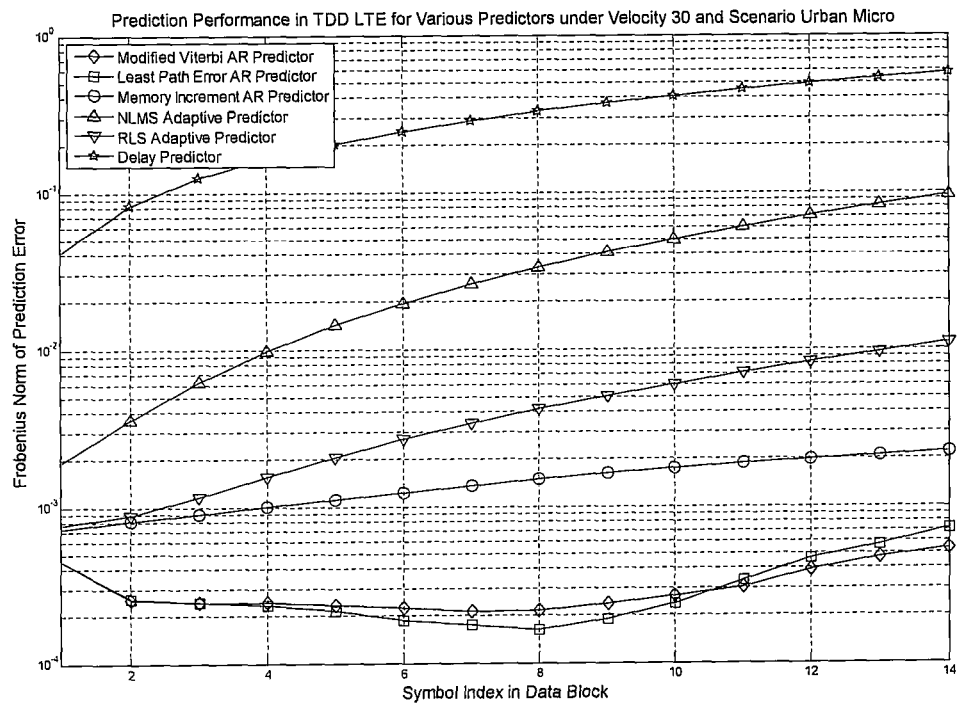
Figure 19:
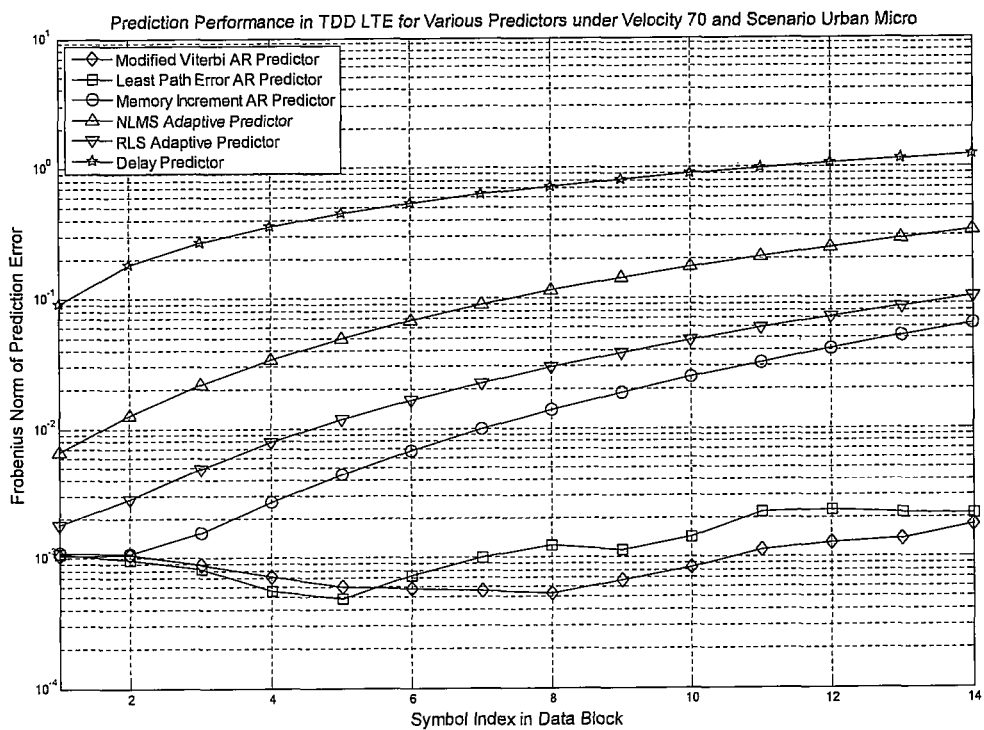
Figure 20:
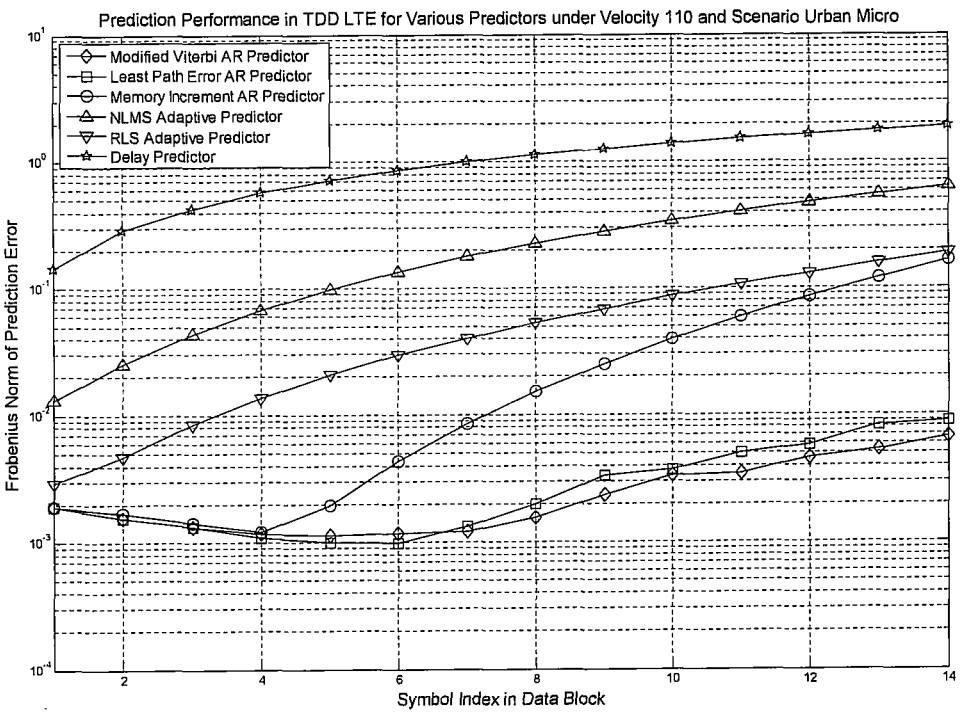
Figure 21:
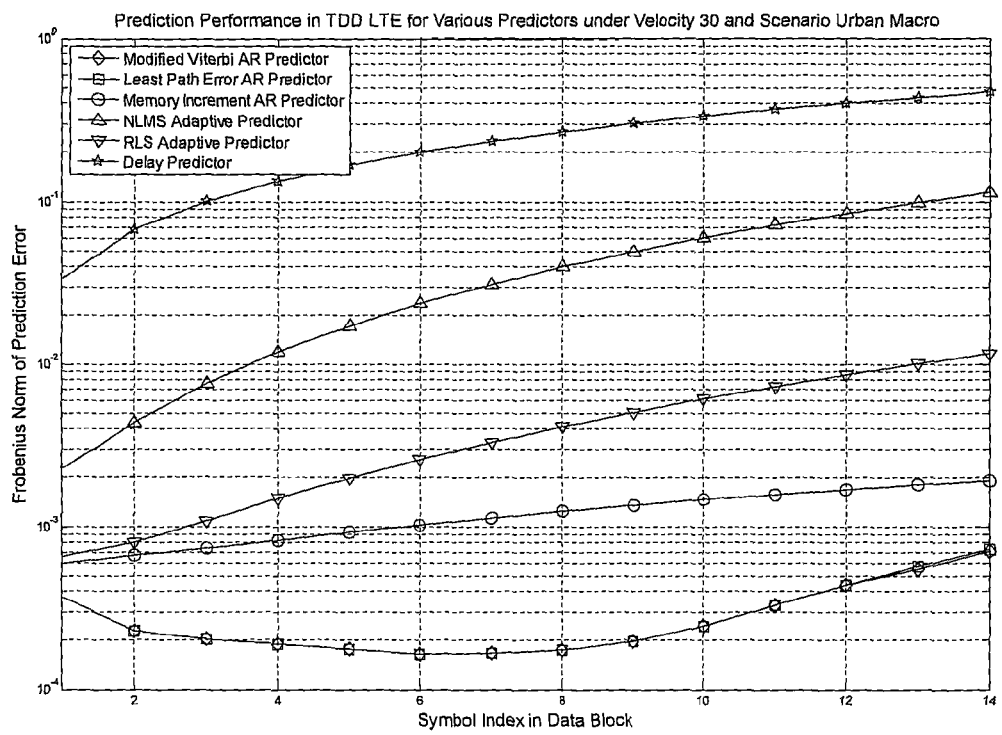
Figure 22:
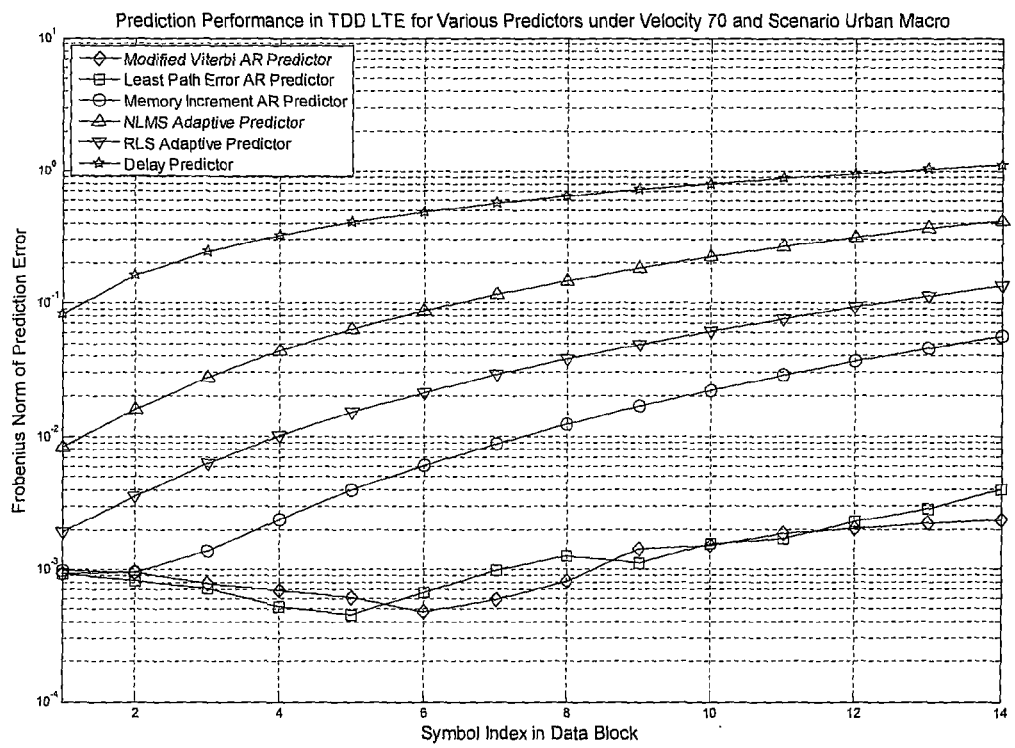
Figure 23:
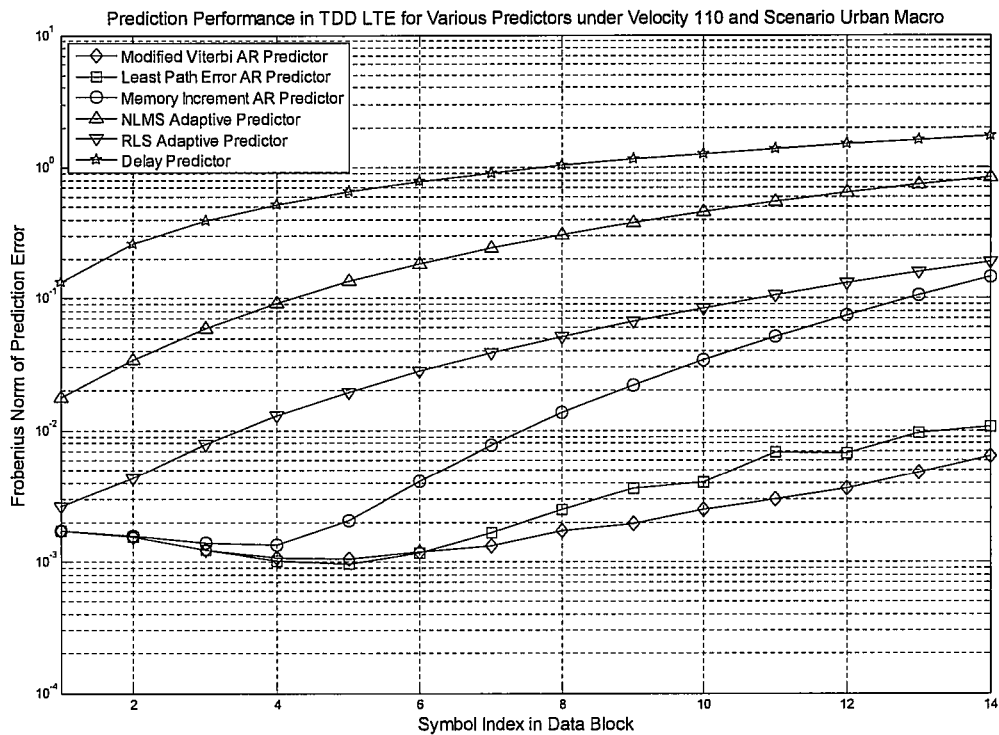
Figure 24:
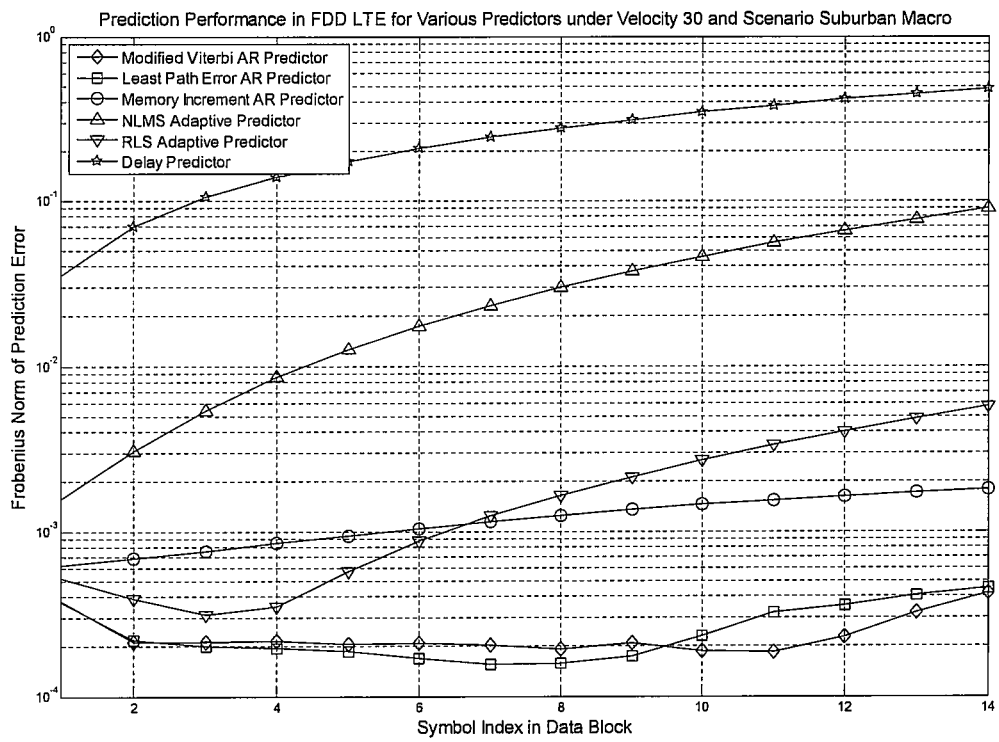
Figure 25:
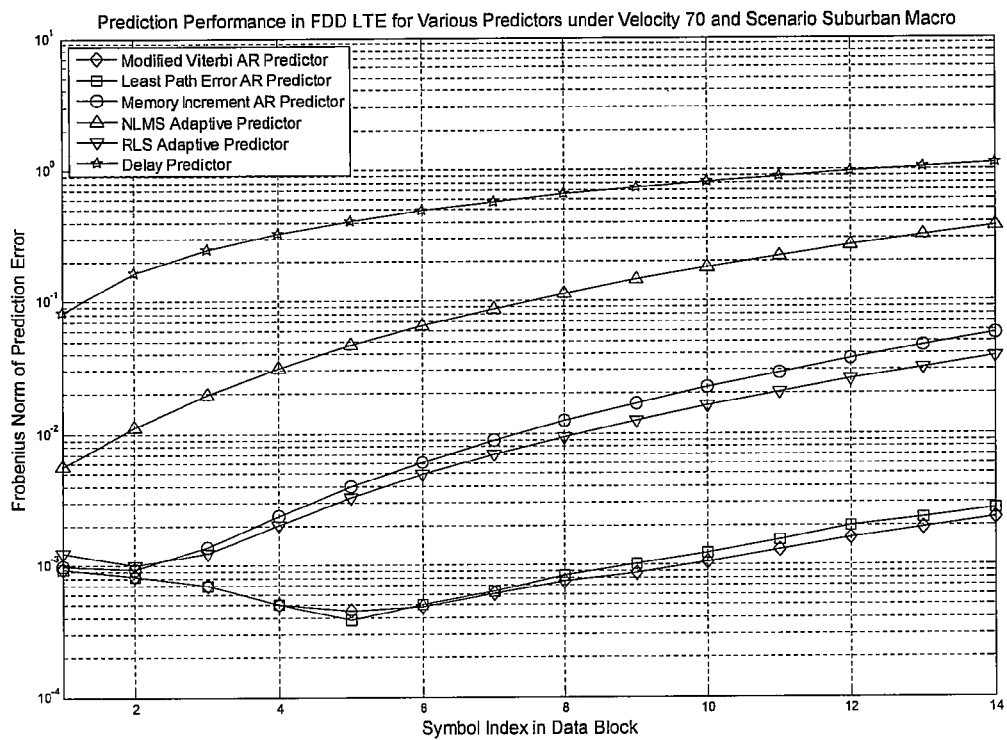
Figure 26:
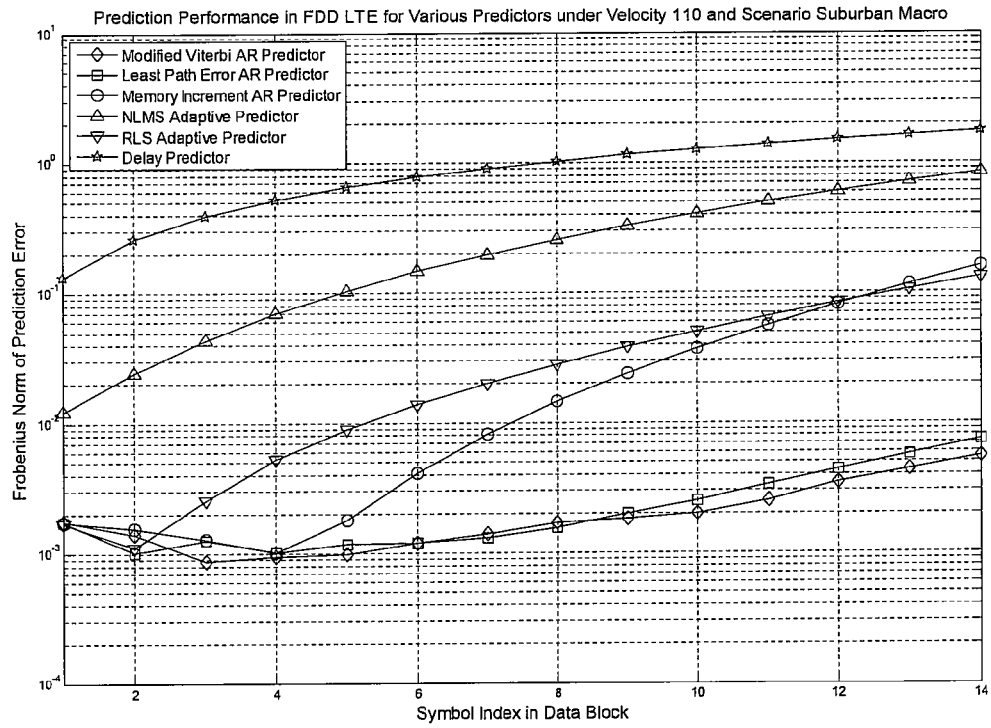
Figure 27:
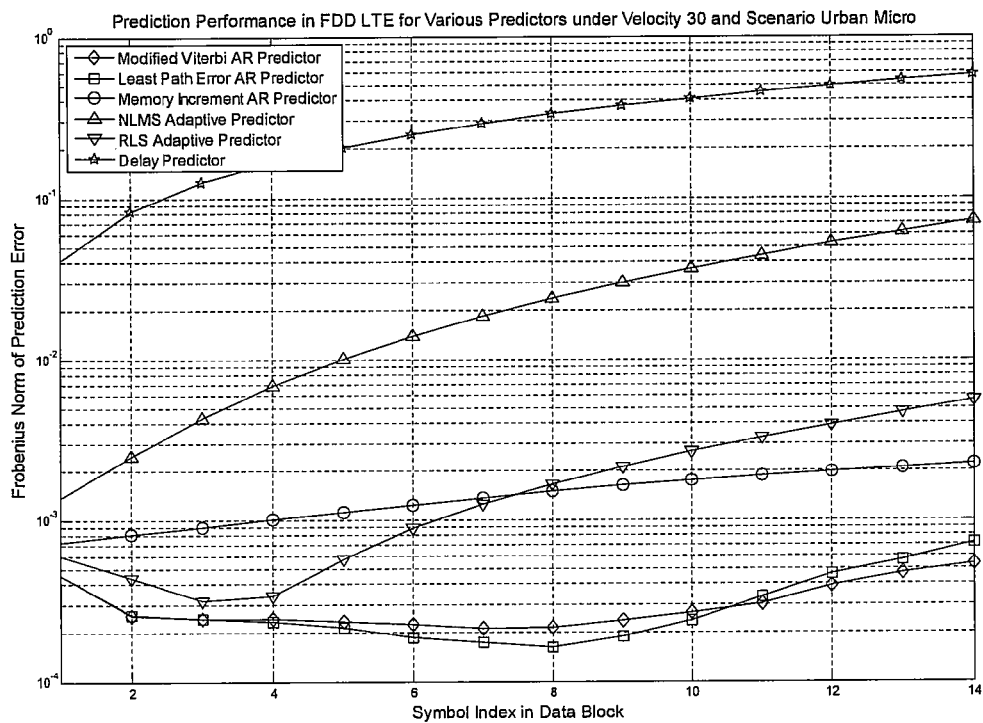
Figure 28:
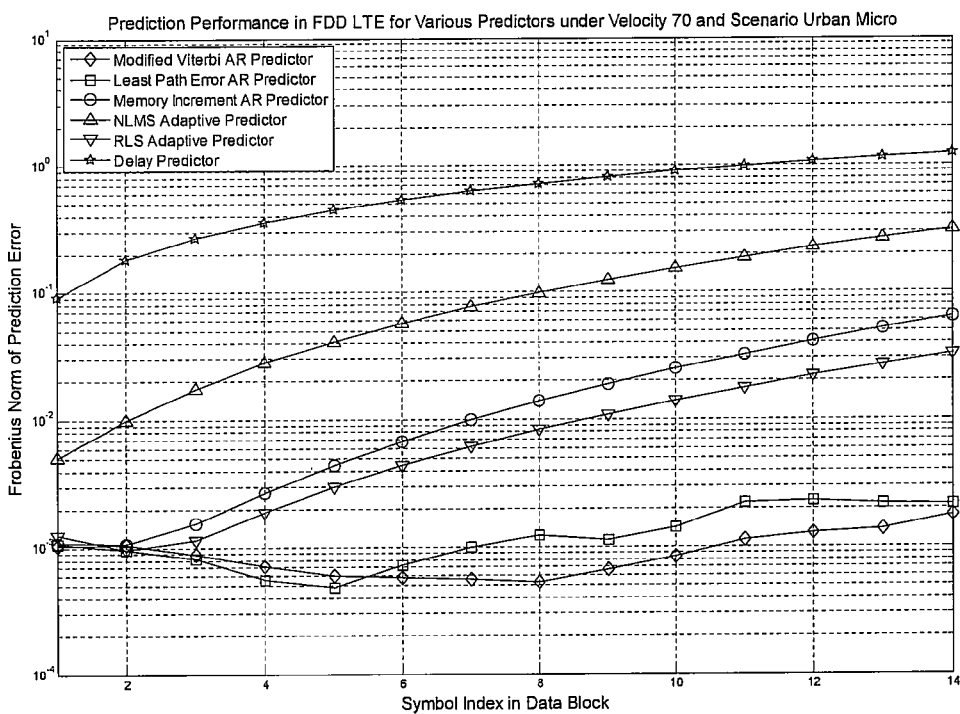
Figure 29:
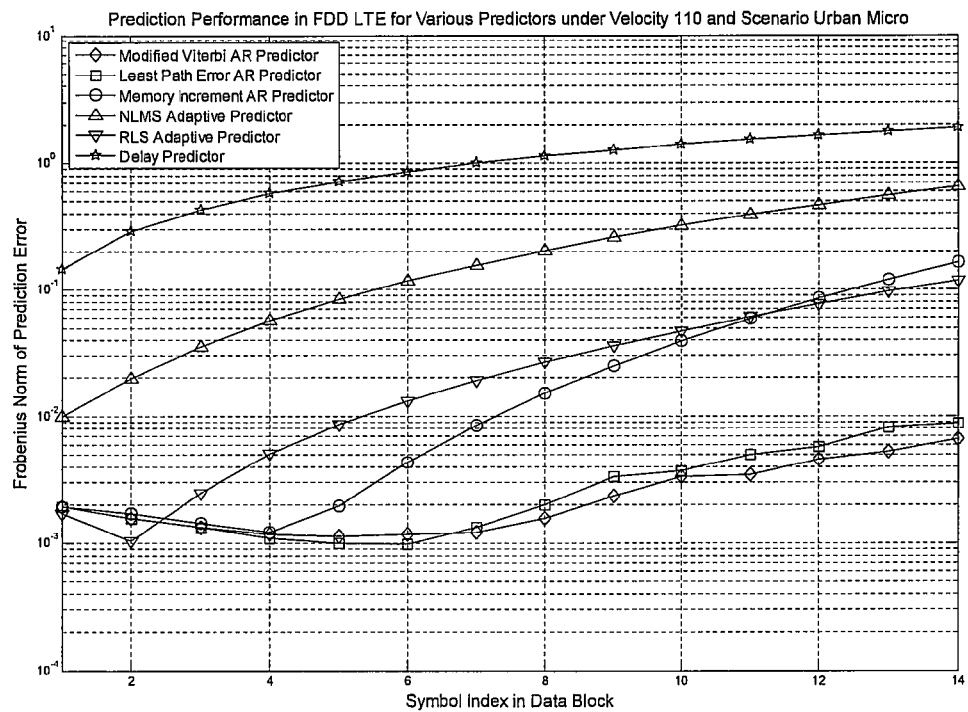
Figure 30:
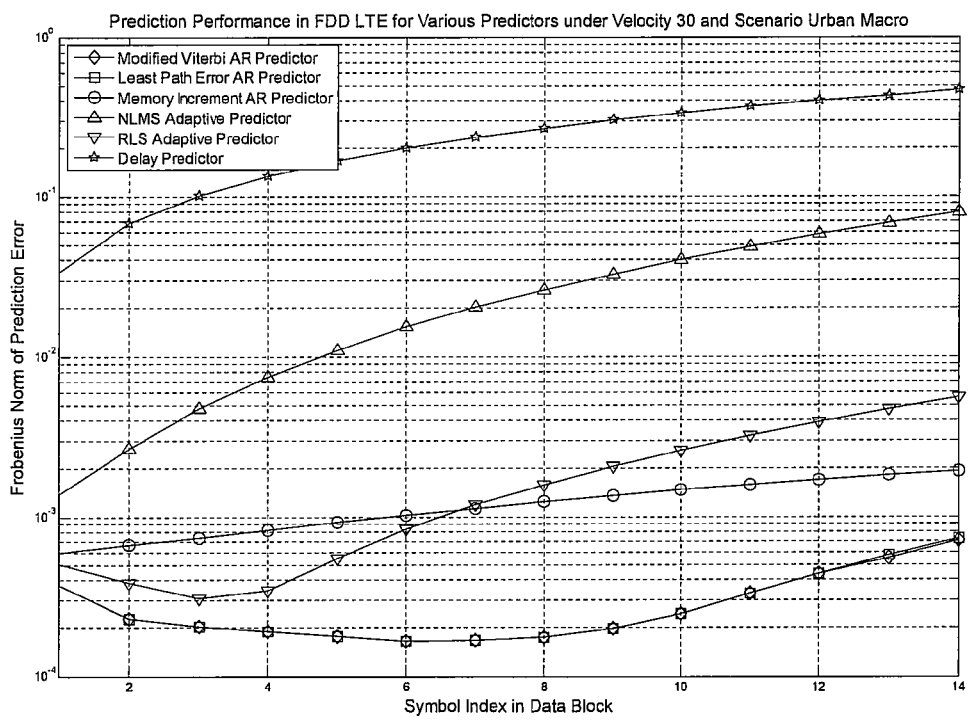
Figure 31:
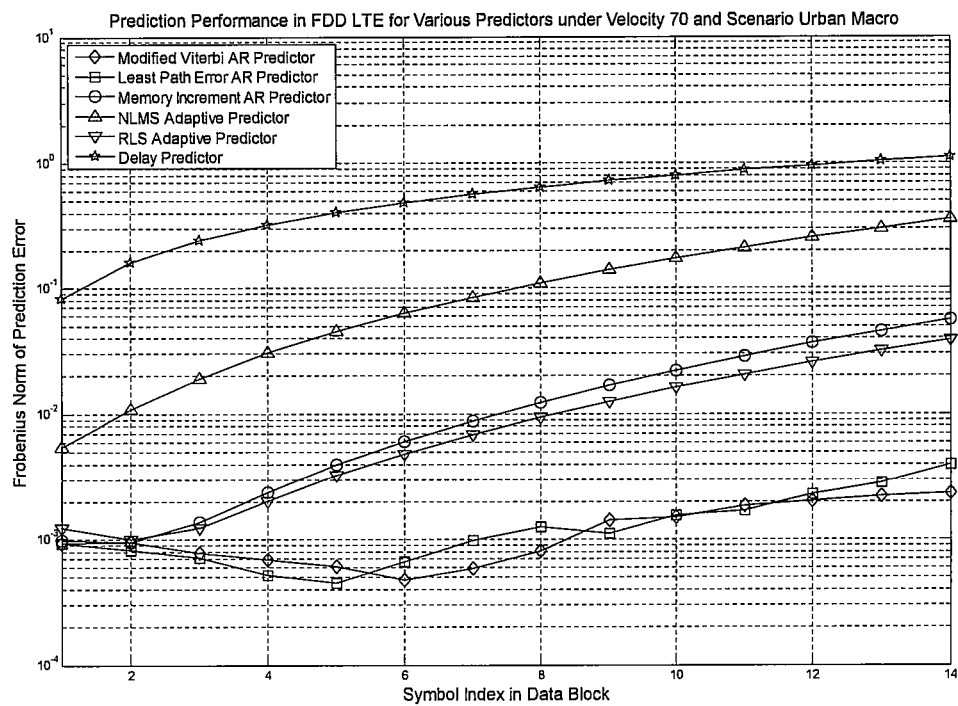
Figure 32:
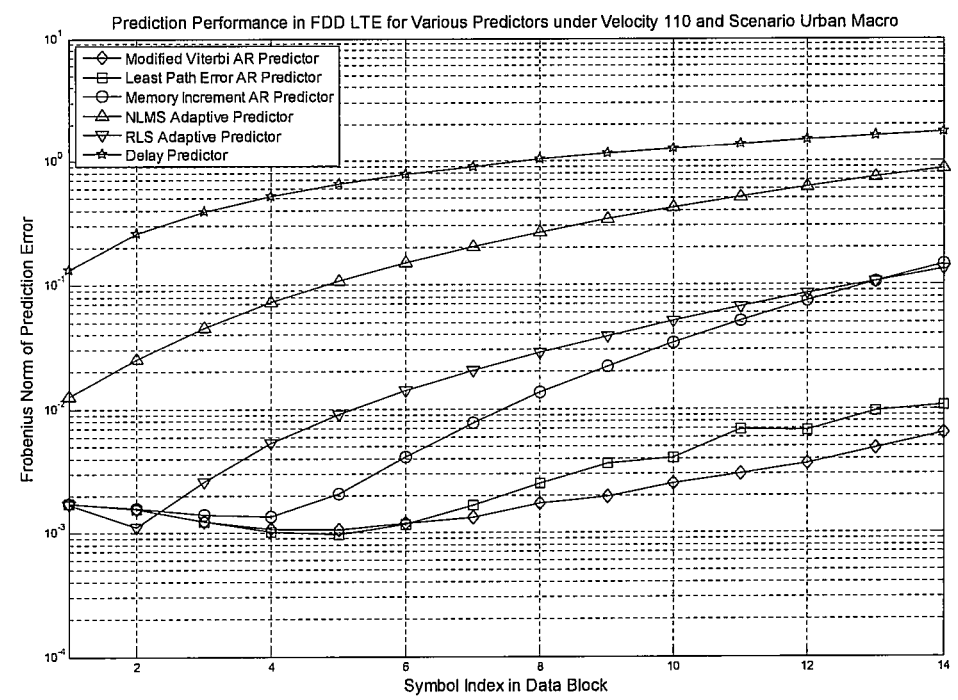

By way of a non-limiting example, FIG. 14 specifically shows a symbol-by-symbol trellis AR channel predictor with MMSE criterion according to the present application. The symbol-by-symbol trellis AR channel predictor with MMSE criterion is arranged to perform the following actions.

Action 1: Acquire Channel Samples $\tilde{H}=(\tilde{H}_1, \tilde{H}_2, \ldots, \tilde{H}_{N_{Imp}})$ as Candidate Channel Samples.

In TDD communication system, use estimated receiving channel samples as the initial candidate channel samples to predict the following transmitting channel samples, based on the channel reciprocity of TDD communication systems.

In FDD communication systems, use estimated receiving channel samples as the initial candidate channel samples to predict the following receiving channel samples.

Action 2: Determine the Prediction Strategies Set $p_{opt}$ in the Training Stage.

Use small portion of the consecutive candidate channel samples to determine the optimal prediction strategy for predicting channel sample on each symbol.

A. Modified Viterbi Algorithm
1. For the first symbol, calculate prediction error for each state $S_{i,1}=(M_i,I_i,P_i)$ from the candidate channel samples;
2. For each following symbol:
   1) Use Eq. (3) to calculate the corresponding predicting channel samples for each branch that merges at the state;
   2) Calculate the prediction errors for these branches and then obtain the corresponding path errors;
   3) Select the one with the minimal path error as the survival path for this state;
   4) Repeat the above three operations on each of the states at this symbol.
3. For the last symbol, determine the minimal path error among all survival path errors and preserve the corresponding survival path $p_{opt}$.

B. Least Path Error Algorithm
1. For the first symbol, calculate prediction error for each state $S_{i,1}=(M_i,I_i,P_i)$ from the estimated channel samples, and then select the one with the minimal prediction error as the survival path;
2. For each following symbol:
   1) Use Eq. (3) to calculate the corresponding predicting channel sample for the only branch arrives at each state;
   2) Calculate the prediction errors for these branches and then obtain the corresponding path errors;
   3) Select the one with the minimal path error as the survival path for this symbol.
3. For the last symbol, preserve the only survival path $p_{subopt}$.

C. Memory Increment Algorithm
The searching stage is not needed any more, and the prediction strategy for the nth symbol is fixed to $(M_n=N_{smp}+n-1,I_n=1,P_n=1)$.

Action 3: Determine the Prediction Weights in Accordance with the Determined Prediction Strategy By way of a non-limiting example, the action of determining the prediction weights may comprise: calculating prediction weights corresponding to all possible prediction strategies based on the statistical properties in advance; and selecting a prediction weight corresponding to the determined prediction strategy.

In understanding the calculation of model weights for all possible prediction strategies according to the embodiment of the present application in more detail, it is helpful to present the procedures of calculating model weights $W=(W_0, W_1, \ldots, W_{(M-1)})$ for all possible (M,I,P) combinations in certain scenario.

Use the spaced-frequency spaced-time correlations of the wireless channel in any specified scenario to calculate the corresponding model weights.
1. Obtain the maximal Doppler frequency $f_D$ using Eq. (16);
2. Obtain the maximal channel delay $\tau_{max}$ from synchronization;
3. Obtain the estimation noise energy $\sigma_e^2$ from channel estimation;
4. Obtain the Toeplitz spaced-frequency spaced-time correlations matrix $R_{ml}$ using Eq. (18);
5. Obtain the model weights matrix W for the specified scenario using Eq. (8).

By way of another non-limiting example, the action of determining the prediction weights may comprise calculating the prediction weights based on the statistical properties in accordance with the prediction strategy determined in Action 2. Here, the calculation of the prediction weights may also use Eq. (18).

Action 4: Continue Channel Prediction in the Predicting Stage Use Eq. (3) and the determined prediction strategies set to calculate predicting channels.

As follows are examples of the simulation results for prediction performance as achieved by the proposed channel predictor implemented on a base station in LTE. In order to conform to the specification, the term data block is replaced by subframe, and symbol denotes an OFDM symbol.

In the subsequent simulations, the adaptive channel predictor is used as a comparison and the delay channel predictor, which directly takes the estimated channel sample on the last symbol in the nearest obtained subframe as the prediction for all the predicting channel samples in the following subframes, is used as an indication of the channel variation.

The common system configuration is listed in Table 1.

TABLE 1

Common system configuration

| Channel Model | 3GPP SCM (TR 25.996) | Central Modulation Carrier Frequency | 2350 mHz |
|---|---|---|---|
| Antennae Mode | Tx: 2, Rx: 2 | Subcarrier Interval | 15 kHz |
| FFT Length | 2048 | Cyclic Prefix | 144 |
| Subframe Structure | 14 symbols | Subframe Interval | 1 ms |

The configuration for the proposed channel predictor is listed in Table 2.

TABLE 2

Configuration for the proposed channel predictor

| Delay Power Spectrum Mode | Exponential | Mean Delay Spread | 0.1 μs in SMa, 0.98 μs in UMi, 2.53 μs in UMa |
|---|---|---|---|
| Searching Ratio | 5% of total subframes | Known Channel Samples | 28 |
| Sample Interval Bound | 0.5 subframe | Prediction Horizon Bound | 0.5 subframe |

The configuration for the adaptive channel predictor is listed in Table 3.

TABLE 3

Configuration for the adaptive channel predictor

| Algorithm | NLMS | RLS |
|---|---|---|
| Step Size | 0.5 | 0.9 |
| Memory Length | 28 | 28 |
| Training Period | 14 symbols each subframe | 14 symbols each subframe |

FIG. 9 shows a prediction data scheme for the proposed channel predictor in TDD. In TDD LTE, the estimated channel samples in the uplink (UL) subframes are used as the candidate channel samples to predict channel samples in the following downlink (DL) subframes, based on the channel reciprocity. The frame structure for TDD is "DSUUUD-SUUU". As shown in FIG. 9, a "D" box denotes a DL subframe, a "U" box denotes a UL subframe and an "S" box denotes a special subframe.

FIG. 10 shows a prediction data scheme for the proposed channel predictor in FDD. In FDD LTE, the estimated channel samples in the received subframes are used as the candidate channels samples to predict channel samples in the following subframes. The prediction data scheme for the proposed channel predictor is illustrated in FIG. 10. Here, an "S" box denotes a subframe.

FIGS. 15~32 illustrates performance evaluation of various proposed channel predictors (prediction)/various adaptive channel predictors and the delay channel predictor in TDD/FDD LTE under various scenarios and velocities.

In conclusion, with the above simulation results, one sees that compared to the existing solutions, the main advantages of the proposed invention are summarized as below:

1. Some embodiments of the proposed channel predictor provide better prediction performance than the existing ones.
   1) The proposed channel predictor yields much better prediction accuracy than the existing ones;
   2) The proposed channel predictor provides much more resistance to the error propagation than the existing ones;
   3) The performance degradation over symbols is obviously alleviated compared to the existing ones;
   4) The proposed channel predictor represents a statistical adaptation and thus achieves much longer prediction range than the existing ones;
2. Some embodiments of the proposed channel predictor need fewer candidate channel samples for training purpose than the existing ones.
   1) The proposed channel predictor needs only a few or even none of the candidate channel samples in training appropriate prediction strategies. Prediction model with the obtained strategies can maintain the adaptation to the channel variation for a long range;
   2) In contrast, the adaptive channel predictors demand sustained training, without which prediction performance degrades significantly;
   3) In contrast, the empirical channel predictors also need very large amount of channel samples in constructing model weights;
   4) Considerable memory occupation and processing latency are circumvented in the proposed channel predictor;
3. Some embodiments of the proposed channel predictor are more versatile than the existing ones.
   1) The proposed channel predictor is able to yield superb prediction performance in both FDD and TDD communication systems;
   2) In contrast, the adaptive channel predictors demand large number of consecutive channel samples which are very hard or almost impossible to be acquired in TDD communication systems. Consequently, their usages in TDD communication systems are greatly constrained;
4. Due to its intrinsic fitness for TDD communication systems, the proposed channel predictor can be implemented on the transmitter side by exploiting the channel reciprocity. Therefore, some very serious and well known problems introduced by the feedback link that transmits the predicted channel samples can be circumvented and the system robustness is then enhanced;
5. Some embodiments of the proposed channel predictor are very flexible in implementation under various circumstances.
   1) The prediction mode, i.e., the configuration of the number of the estimated channel samples and the range of the prediction, can be adjusted according to the data structure employed by any specified communication system (e.g., the uplink-downlink configurations in TDD LTE);
   2) The requirement for processing load and performance can be readily adjusted and satisfied by restricting the candidate prediction strategies in different degrees or by adopting different trellis searching schemes.

It is to be understood that the embodiments of the invention can be embodied strictly as a software program, or as firmware, or as hardware and/or circuitry alone, or as configurations in other computing systems, or as any form of combination of them, such as within a base station, a mobile station or other node in the network.

The foregoing description gives only the preferred embodiments of the present invention and is not intended to limit the present invention in any way. Thus, any modification, substitution, improvement or like made within the spirit and principle of the present invention should be encompassed by the scope of the present invention.

Abbreviations
AR—Auto-Regression
BER—Bit Error Rate
BS—Base Station
CoMP—Coordinated Multipoint
CSI—Channel State Information
DL—Downlink
FDD—Frequency Division Duplex
FFT—Fast Fourier Transform
LPE—Least Path Error
LTE—Long Term Evolution
MIMO—Multiple-Input Multiple-Output
MMSE—Minimum Mean-Square Error
MS—Mobile Station
NLMS—Normalized Least Mean Square
NNs—Neural Networks
OFDM—Orthogonal Frequency Division Multiplexing
PAST—Projection Approximation Subspace Tracking
RLS—Recursive Least Square
SISO—Single-Input Single-Output
SMa—Suburban Macro
SVM—Support Vector Machine
SVD—Singular Value Decomposition
TDD—Time Division Duplex
UL—Uplink
UMa—Urban Macro
UMi—Urban Micro
WSSUS—Wide-Sense Stationary Uncorrelated Scattering Reference List

[1] Gokhan Mergen, et al., "Method and apparatus for filtering noisy estimates to reduce estimation errors", U.S. Pat. No. 7,746,970, 2010.

[2] Chang kee Min, et al., "MIMO-OFDM Downlink Channel Prediction for IEEE802.16e Systems Using Kalman Filter", IEEE WCNC, pages 942-946, 11-15 Mar. 2007.

[3] Mehdi Seyfi, et al., "An LMS Like Predictive Estimation for Fading MIMO Channels", PIMRC 2007.

[4] Abdorreza HEIDARI, Amir K. KHANDANI, Derek MCAVOY, "Adaptive channel prediction system and method", U.S. Patent 2008/0240260, 2008.

[5] Hee-Soo Lee, et al., "Apparatus and method for generating channel information and apparatus and method for adaptive transmission employing the same", U.S. Pat. No. 7,848,296, 2010.

[6] Chan-soo Hwang, Yongin, "Signal receiving apparatus and method adapted for use with a time-variant channel", U.S. Pat. No. 7,221,716, 2007.

[7] Sharon Gannott, Amir Leshemt, Ofer Shayevitz, "Tracking a MIMO Channel Singular Value Decomposition via Projection Approximation", IEEE 24th Convention of Electrical and Electronics Engineers in Israel, pages 91-94, November 2006.

[8] G. Wolfle and F. M. Landstorfer, "Field Strength Prediction in Indoor Environments with Neural Networks", 47th IEEE International Conference on Vehicular Technology (VTC), pages 82-86, May 1997.

[9] Jiancheng Sun, "Nonlinear prediction of mobile-radio fading channel using recurrent least squares support vector machines and embedding phase space", 2004 International Conference on Communications, Circuits and Systems, pages 282. 27-29, June 2004.

[10] S. M. Kay, Fundamentals of Statistical Signal Processing: Estimation Theory, Englewood Cliffs, N.J.: Prentice-Hall, 1993.

[11] J. G. Proakis, Digital Communications, 4th ed., New York: McGraw-Hill, 2000.

[12] P. A. Bello, "Characterization of Randomly Time-Variant Linear Channels", IEEE Trans. Commun., vol. CS-II, pages 360-393, December 1963.

[13] COST 207, "Digital land mobile radio communications", Office for Official Publications of the European Communities, Final Report, Luxembourg, 1989.

[14] W. C. Jakes, Jr., Microwave Mobile Communications. New York: Wiley, 1974.

I claim:

1. A channel predicting method in a communication network comprising a time-varying wireless channel, the method comprising:
    determining a prediction strategy;
    selecting a certain number of channel samples from candidate channel samples in accordance with the prediction strategy, the channel samples each corresponding to one symbol in a time domain;
    determining prediction weights in accordance with the prediction strategy and statistical properties of the time-varying wireless channel;
    weighting the selected channel samples with the determined prediction weights to obtain a predicting channel sample as a prediction result.

2. The method of claim 1, wherein the candidate channel samples comprise previously predicted channel samples.

3. The method of claim 1, wherein the prediction strategy includes a triplet of three parameters (M, I, P), in which M denotes the number of the selected channel samples, I denotes a distance between two contiguously selected channel samples in the candidate channel samples, and P denotes a distance between the predicting channel sample and the selected channel sample that is closest to the predicting channel sample.

4. The method of claim 3, wherein I and P are fixed, and M is incremented symbol by symbol.

5. The method of claim 1, wherein the statistical properties of the time-varying wireless channel include spaced-frequency spaced-time correlations.

6. The method of claim 5, wherein the spaced-frequency spaced-time correlations are based on a delay power spectrum and a spaced-time correlation function of the time-varying wireless channel.

7. The method of claim 1, wherein the determining prediction weights comprises:
    calculating prediction weights corresponding to all possible prediction strategies based on the statistical properties in advance;
    selecting a prediction weight corresponding to the determined prediction strategy.

8. The method of claim 1, wherein the determining prediction weights comprises calculating the prediction weights based on the statistical properties in accordance with the determined prediction strategy.

9. The method of claim 1, wherein the determining a prediction strategy comprises training some previous channel samples of the candidate channel samples in terms of respective prediction errors to determine the prediction strategy.

10. The method of claim 9, wherein a Viterbi Algorithm is used in the training.

11. The method of claim 1, wherein the channel predicting method is performed symbol by symbol.

12. The method of claim 11, wherein the prediction strategy is different on each symbol.

13. An apparatus for channel predicting in a communication network comprising a time-varying wireless channel, the apparatus comprising:
    a prediction strategy determination circuit configured to determine a prediction strategy;
    a first selection circuit configured to select a certain number of channel samples from candidate channel samples in accordance with the prediction strategy, each channel sample corresponding to one symbol in a time domain;
    a prediction weights determination circuit configured to determine prediction weights in accordance with the prediction strategy and statistical properties of the time-varying wireless channel;
    a weighting circuit configured to weight the selected channel samples with the determined prediction weights to obtain a predicting channel sample as a prediction result.

14. The apparatus of claim 13, wherein the candidate channel samples comprise previously predicted channel samples.

15. The apparatus of claim 13, wherein the prediction strategy includes a triplet of three parameters (M, I, P), in which M denotes the number of the selected channel samples, I denotes a distance between two contiguously selected channel samples in the candidate channel samples, and P denotes a distance between the predicting channel sample and the selected channel sample that is closest to the predicting channel sample.

16. The apparatus of claim 15, wherein I and P are fixed, and M is incremented symbol by symbol.

17. The apparatus of claim 13, wherein the statistical properties of the time-varying wireless channel include spaced-frequency spaced-time correlations.

18. The apparatus of claim 17, wherein the spaced-frequency spaced-time correlations are based on a delay power spectrum and a spaced-time correlation function of the time-varying wireless channel.

19. The apparatus of claim 13, wherein the prediction weights determination circuit comprises:
    a first calculation circuit configured to calculate prediction weights corresponding to all possible prediction strategies based on the statistical properties in advance;
    a second selection circuit configured to select a prediction weight corresponding to the determined prediction strategy.

20. The apparatus of claim 13, wherein the prediction weights determination circuit comprises a second calculation circuit configured to calculate the prediction weights based on the statistical properties in accordance with the determined prediction strategy.

21. The apparatus of claim 13, wherein the prediction strategy determination circuit comprises a training circuit configured to train some previous channel samples of the candidate channel samples in terms of respective prediction errors to determine the prediction strategy.

22. The apparatus of claim 21, wherein a Viterbi Algorithm is used in the training.

23. The apparatus of claim 13, wherein the apparatus performs channel predicting symbol by symbol.

24. The apparatus of claim 23, wherein the prediction strategy is different on each symbol.

* * * * *